United States Patent
Kashiwagi et al.

(10) Patent No.: US 8,389,156 B2
(45) Date of Patent: Mar. 5, 2013

(54) NEGATIVE ELECTRODE FOR NON-AQUEOUS ELECTROLYTE SECONDARY BATTERY, METHOD FOR PRODUCING THE SAME, AND NON-AQUEOUS ELECTROLYTE SECONDARY BATTERY

(75) Inventors: Katsumi Kashiwagi, Nara (JP); Kazuyoshi Honda, Osaka (JP); Masaki Hasegawa, Osaka (JP); Masaya Ugaji, Osaka (JP); Yasutaka Kogetsu, Osaka (JP); Shuji Ito, Nara (JP)

(73) Assignee: Panasonic Corporation, Osaka (JP)

(*) Notice: Subject to any disclaimer, the term of this patent is extended or adjusted under 35 U.S.C. 154(b) by 1050 days.

(21) Appl. No.: 12/303,854
(22) PCT Filed: Aug. 22, 2007
(86) PCT No.: PCT/JP2007/066278
§ 371 (c)(1), (2), (4) Date: Dec. 8, 2008
(87) PCT Pub. No.: WO2008/023733
PCT Pub. Date: Feb. 28, 2008

(65) Prior Publication Data
US 2010/0129711 A1 May 27, 2010

(30) Foreign Application Priority Data
Aug. 25, 2006 (JP) ................... 2006-228633
Sep. 26, 2006 (JP) ................... 2006-260802

(51) Int. Cl.
H01M 4/02 (2006.01)
(52) U.S. Cl. ................... 429/209; 429/233; 429/238
(58) Field of Classification Search .................. None
See application file for complete search history.

(56) References Cited

U.S. PATENT DOCUMENTS
2006/0099507 A1* 5/2006 Kogetsu et al. ............ 429/218.1

FOREIGN PATENT DOCUMENTS

| JP | 2002-083594 | 3/2002 |
|---|---|---|
| JP | 2002-279974 | 9/2002 |
| JP | 2002-313319 | 10/2002 |
| JP | 2003-017040 | 1/2003 |
| JP | 2003-303586 | 10/2003 |
| JP | 2004-127561 | 4/2004 |
| JP | 2005-196970 | 7/2005 |
| JP | 2005-209533 | 8/2005 |

* cited by examiner

*Primary Examiner* — Maria J Laios
(74) *Attorney, Agent, or Firm* — McDermott Will & Emery LLP

(57) ABSTRACT

This invention provides a negative electrode and a non-aqueous electrolyte secondary battery including the negative electrode. The negative electrode includes a Li-absorbing element as a negative electrode active material, is free from deformation, separation of the negative electrode active material layer from the negative electrode current collector, and deposition of lithium on the negative electrode current collector, and is excellent in cycle characteristic, large-current discharge characteristic, and low-temperature discharge characteristic.

The negative electrode of this invention includes: a current collector having depressions and protrusions on a surface in the thickness direction thereof; and a negative electrode active material layer that includes a plurality of columns containing a negative electrode active material that absorbs and releases lithium ions, the columns being grown outwardly from the surface of the current collector. The negative electrode of this invention is characterized in that the columns are grown at an inclination angle relative to the direction perpendicular to the surface of the current collector, and that the inclination angle of the columns changes reversibly depending on absorption and release of lithium ions by the negative electrode active material.

12 Claims, 16 Drawing Sheets (a)

Charge ⬇   Discharge ⬆

(b)

(a)

Charge / Discharge (b)

(a) Upon start of a charge (b) Upon start of a discharge (a)

(b)

(a)

(b)

(a)

(b)

NEGATIVE ELECTRODE FOR NON-AQUEOUS ELECTROLYTE SECONDARY BATTERY, METHOD FOR PRODUCING THE SAME, AND NON-AQUEOUS ELECTROLYTE SECONDARY BATTERY

RELATED APPLICATIONS

This application is the U.S. National Phase under 35 U.S.C. §371 of International Application No. PCT/JP2007/066278, filed on Aug. 22, 2007, which in turn claims the benefit of Japanese Application Nos. 2006-228633, filed on Aug. 25, 2006 and 2006-260802, filed Sep. 26, 2006, the disclosures of which Applications are incorporated by reference herein.

TECHNICAL FIELD

The present invention relates to a negative electrode for a non-aqueous electrolyte secondary battery, a method for producing the same, and the non-aqueous electrolyte secondary battery.

BACKGROUND ART

With the remarkable proliferation of portable appliances such as personal computers and cellular phones, there is an increasing demand for batteries used as the power source for portable appliances. Among the batteries used in such applications, lithium ion secondary batteries have high energy density and excellent cycle characteristics, so demand for lithium ion secondary batteries is particularly increasing. Lithium ion secondary batteries usually include a positive electrode including a lithium-containing composite oxide, a negative electrode including lithium metal, a lithium alloy, or a negative electrode active material that absorbs and releases lithium ions, and a non-aqueous electrolyte. Recently, in an attempt to further improve the performance of lithium ion secondary batteries, the use of elements capable of absorbing lithium ions (hereinafter referred to as "Li-absorbing elements") as negative electrode active materials has been studied.

Li-absorbing elements absorb lithium, for example, by alloying with lithium. Among them, silicon and tin, which have high theoretical capacity densities of reversible absorption and release of lithium (hereinafter referred to as simply "theoretical capacity density"), are viewed as promising negative electrode active materials. Currently, various lithium ion secondary batteries using Li-absorbing elements as negative electrode active materials are proposed. For example, there has been proposed a lithium ion secondary battery having a negative electrode that includes a negative electrode current collector and a negative electrode active material layer made of a silicon amorphous or microcrystalline thin film formed on the surface of the negative electrode current collector (e.g., see Patent Document 1 and Patent Document 2). In these Patent Documents, the silicon thin film is formed, for example, by chemical vapor deposition (CVD) or evaporation.

However, when Li-absorbing elements absorb and release lithium ions, they repeatedly expand and contract and undergo large volume changes, and this property of Li-absorbing elements limits their use as negative electrode active materials. That is, when a Li-absorbing element is included in a negative electrode active material layer of a negative electrode, the negative electrode active material layer undergoes large volume changes due to the absorption and release of lithium ions, thereby creating a large stress. Such a negative electrode is subject to deformation such as distortion, wrinkles, or breakage. Also, it is highly likely that the negative electrode active material layer becomes separated from the negative electrode current collector. This may result in creation of space between the negative electrode and the separator or the negative electrode active material layer, uneven charge/discharge reaction, and degradation of cycle characteristics.

To solve these problems associated with Li-absorbing elements, it has been proposed to form a space in a negative electrode active material layer for easing the stress created by the expansion of a Li-absorbing element, in order to suppress the deformation of the negative electrode or the separation of the negative electrode active material layer (see, for example, Patent Documents 3 to 5). Patent Documents 3 to 5 propose a negative electrode including a negative electrode current collector and a negative electrode active material layer made of a plurality of columns comprising a Li-absorbing element which are joined together. The plurality of columns are formed in a certain pattern on the surface of the negative electrode active material layer in such a manner that they extend in the direction perpendicular to said surface and are spaced apart from one another. In Patent Document 3, columns are formed by photoresist method. In Patent Document 4, columns are formed by etching. In Patent Document 5, in forming columns, mesh is placed between a deposition source of a Li-absorbing element and a negative electrode current collector to provide the surface of the negative electrode current collector with an area onto which the Li-absorbing element deposits and an area onto which it does not deposit. When a negative electrode as described in Patent Documents 3 to 4 is mounted in a lithium ion secondary battery, a major part of the surface of the positive electrode active material layer faces the exposed part of the negative electrode current collector rather than facing the negative electrode active material layer. Thus, the lithium supplied from the positive electrode active material layer during charging tends to deposit on the exposed part of the negative electrode current collector without being absorbed into the negative electrode active material layer. As a result, the lithium is not efficiently released from the negative electrode during discharging, the coulombic efficiency and the capacity retention rate lower, and eventually the cycle characteristics degrade. Further, the battery safety also lowers.

Also, there has been proposed a negative electrode that is composed of a thin film of a Li-absorbing element formed on the surface of a negative electrode current collector and columns of the Li-absorbing element formed on the thin film, and the area of these columns in contact with the thin film is $2\times10^{-7}$ m$^2$ or less (e.g., see Patent Document 6). In this negative electrode, deposition of lithium on the negative electrode current collector surface during charging is prevented. However, since the area of the negative electrode current collector surface other than the area where the columns are formed is also covered with the thin film of the Li-absorbing element, expansion of the Li-absorbing element cannot be sufficiently eased. Hence, deformation of the negative electrode may occur.

Further, there has been proposed a negative electrode including a negative electrode current collector and a negative electrode active material layer formed on the surface of the negative electrode current collector, and this negative electrode active material layer is composed of a plurality of columns that are spaced apart from one another and include a Li-absorbing element, and the columns are grown slantwise from the surface of the negative electrode current collector at an angle relative to the direction perpendicular to said surface (see, for example, Patent Document 7). In Patent Document 7, since the plurality of columns are formed slantwise, the surface of the negative electrode current collector does not directly face the positive electrode active material layer, and the lithium released from the positive electrode active material layer is efficiently absorbed into the negative electrode active material layer. Also, since the columns are spaced apart from one another, the stress due to the expansion of the Li-absorbing element can be eased, so that the deformation of the negative electrode is sufficiently prevented.

However, the technique of Patent Document 7 needs to be improved in terms of preventing separation of the columns from the negative electrode current collector. That is, when a plurality of columns are formed in a certain pattern on the surface of a negative electrode current collector, the contact area of the negative electrode current collector and the columns will become small. Thus, the bonding strength between the negative electrode current collector and the columns becomes low, so that the columns become separated from the negative electrode current collector, which may result in degradation of charge/discharge characteristics. Such a technical problem also exists in the negative electrodes of Patent Documents 3 to 6. Further, Patent Document 7 also describes a technique of forming depressions and protrusions on the surface of a negative electrode current collector and growing columns from the surfaces of the protrusions. In this case, the columns are also susceptible to separation in the same manner as described above. Further, in this technique, columns may also grow from the surfaces of the depressions. If columns grow from the surfaces of the depressions, the gaps between the columns become small, so that sufficient pores cannot be formed in the negative electrode active material layer. Hence, the stress due to the expansion of the Li-absorbing element may not be sufficiently reduced.

Further, according to the technique of Patent Document 7, since the columns are always inclined in a certain direction, the interval between the positive electrode active material layer and the columns becomes relatively long, compared with the negative electrodes of Patent Documents 3 to 6. This means that the lithium ions have to move a long distance. Thus, particularly in discharge, large-current discharge cannot be sufficiently carried out, and the discharge capacity at low temperatures may become insufficient.

Patent Document 1: Japanese Laid-Open Patent Publication No. 2002-83594
Patent Document 2: Japanese Laid-Open Patent Publication No. 2002-313319
Patent Document 3: Japanese Laid-Open Patent Publication No. 2004-127561
Patent Document 4: Japanese Laid-Open Patent Publication No. 2003-17040
Patent Document 5: Japanese Laid-Open Patent Publication No. 2002-279974
Patent Document 6: Japanese Laid-Open Patent Publication No. 2003-303586
Patent Document 7: Japanese Laid-Open Patent Publication No. 2005-196970

DISCLOSURE OF THE INVENTION

Problem to be Solved by the Invention

An object of the present invention is to provide a negative electrode for a non-aqueous electrolyte secondary battery which, despite the use of a Li-absorbing element as a negative electrode active material, is capable of preventing deformation of the negative electrode and separation of the negative electrode active material layer from the negative electrode current collector, is free from deposition of lithium on the negative electrode current collector, is excellent in cycle characteristics, is capable of large-current discharge, and is capable of providing a sufficient discharge capacity even at low temperatures.

Also, another object of the present invention is to provide a method for producing the negative electrode for a non-aqueous electrolyte secondary battery of the present invention.

Further, still another object of the present invention is to provide a non-aqueous electrolyte secondary battery including the negative electrode for a non-aqueous electrolyte secondary battery of the present invention.

Means for Solving the Problem

The present invention is directed to a negative electrode for a non-aqueous electrolyte secondary battery, including: a current collector having depressions and protrusions on the surface of one face or both faces in the thickness direction thereof; and a negative electrode active material layer that includes columns containing a negative electrode active material that absorbs and releases lithium ions. The columns are grown outwardly from the surface of the current collector having the depressions and the protrusions, being inclined at an angle relative to the direction perpendicular to the surface of the current collector. The inclination angle of the columns relative to the direction perpendicular to the surface of the current collector changes reversibly depending on absorption and release of lithium ions by the negative electrode active material.

In the negative electrode of the present invention, preferably, each of the columns includes a thin film part and a columnar part adjacent to the thin film part; the thin film part is a thin film formed on a part of the surface of each of the depressions or formed so as to extend from a part of the surface of each of the depressions to at least a part of the surface of the adjacent protrusion; and the columnar part is grown outwardly from at least a part of the surface of each of the protrusions, or at least a part of the surface of each of the protrusions and a part of the surface of the adjacent thin film part, being inclined at an angle relative to the direction perpendicular to the surface of the current collector.

Also, the content of an element in the negative electrode active material is preferably changed continuously or non-continuously toward the grow direction of the columns.

Also, the thin film part preferably has a thickness of 0.5 μm to 5 μm.

In the negative electrode of the present invention, preferably, each of the columns includes an upper columnar part and a lower columnar part that expands and contracts due to absorption and release of lithium more than the upper columnar part; the upper columnar part is a part of the column located on the obtuse angle side in a cross-section of the column in the thickness direction of the current collector, the obtuse angle being formed between the center line of the column in the grow direction thereof and the center line of the current collector in the longitudinal direction thereof; and the lower columnar part is a part of the column located on the acute angle side in the cross-section of the column in the thickness direction of the current collector, the acute angle being formed between the center line of the column in the grow direction thereof and the center line of the current collector in the longitudinal direction thereof.

Also, the content of an element in the negative electrode active material is preferably changed continuously or non-continuously from the acute angle side toward the obtuse angle side in the cross-section of the column in the thickness direction of the current collector, the angle being formed between the center line of the column in the grow direction thereof and the center line of the current collector in the longitudinal direction thereof.

In the negative electrode of the present invention, the area of the contact portions of the columns and the current collector orthogonally projected from the direction perpendicular to the surface of the current collector is preferably 60% or more and less than 100% of the area of the surface of the current collector having the depressions and protrusions orthogonally projected from the direction perpendicular to the surface of the current collector.

Also, the negative electrode active material is preferably a negative electrode active material having a higher theoretical capacity density of reversible lithium absorption and release than the theoretical capacity density of reversible lithium absorption and release of graphite.

Also, the negative electrode active material is preferably at least one selected from the group consisting of silicon and a silicon-containing compound.

Also, the silicon-containing compound is preferably a silicon oxide represented by the formula $SiO_x$ where $0.05<x<1.95$.

Also, the negative electrode active material layer preferably has a thickness of 5 μm to 50 μm.

The present invention relates to a method for producing a negative electrode for a non-aqueous electrolyte secondary battery, including the steps of: (i) working a current collector; (ii) forming a pattern; (iii) forming a thin film; (iv) removing the pattern; and (v) forming columns.

The present invention pertains to a method for producing a negative electrode for a non-aqueous electrolyte secondary battery, including the steps of: (i) working a current collector; (ii) forming a thin film; and (iii) forming columns.

The present invention also relates to a non-aqueous electrolyte secondary battery including a negative electrode for a non-aqueous electrolyte secondary battery of the present invention, a positive electrode reversibly absorbing and releasing lithium ions, a separator, and a non-aqueous electrolyte.

Effect of the Invention

According to the present invention, to ease stress created by the expansion of a high energy-density negative electrode active material, pores can be formed in the negative electrode active material layer. At the same time, by enlarging the contact area of the negative electrode current collector and the columns (negative electrode active material layer) compared to conventional art, sufficient bonding strength can be obtained. It is therefore possible to suppress deformation of the negative electrode such as distortion, wrinkles, or breakage. It is also possible to suppress separation of the negative electrode active material layer and partial exfoliation of the columns. As a result, the energy density, capacity retention rate, and charge/discharge cycle characteristics of the non-aqueous electrolyte secondary battery can be improved.

Also, according to the present invention, the inclination angle of the columns changes reversibly due to the absorption and release of lithium. During charging, in a cross-section of the columns in the thickness direction of the current collector, the angle formed between the center line of the columns in the grow direction thereof and the center line of the current collector in the longitudinal direction thereof increases, so that electrolyte is smoothly guided to the gaps among the columns. This facilitates the ion movement in an early stage of discharge and thus suppresses a drop in discharge voltage due to polarization, thereby enabling stable and sufficient large-current discharge and ensuring sufficient discharge capacity even in a low temperature range. Further, the battery safety also improves.

Also, according to the present invention, the inclination angle of the columns changes reversibly due to the absorption and release of lithium, and during discharging, the distance between the columns and the positive electrode active material layer decreases. Hence, in discharge, stable and sufficient large-current discharge is possible, and sufficient discharge capacity can be ensured even in a low temperature range. Further, the battery safety also improves.

BRIEF DESCRIPTION OF THE DRAWINGS

FIG. 5(a) illustrates a state during charging and FIG. 5(b) illustrates a state during discharging;

FIG. 6(a) illustrates a state during charging and FIG. 6(b) illustrates a state during discharging;

FIG. 7(a) illustrates a state when a charge is started, and FIG. 7(b) illustrates a state when the charge is fully completed and a discharge is started;

FIG. 9(a) illustrates a state of one of the negative electrodes before charging, and FIG. 9(b) illustrates a state of the other negative electrode before charging;

FIG. 10(a) illustrates a state of one of the negative electrodes before charging, and FIG. 10(b) illustrates a state of the other negative electrode before charging;

FIG. 13(a) is a side view, and FIG. 13(b) is a sectional view taken along the line b-b of FIG. 13(a);

BEST MODE FOR CARRYING OUT THE INVENTION

Figure 1:
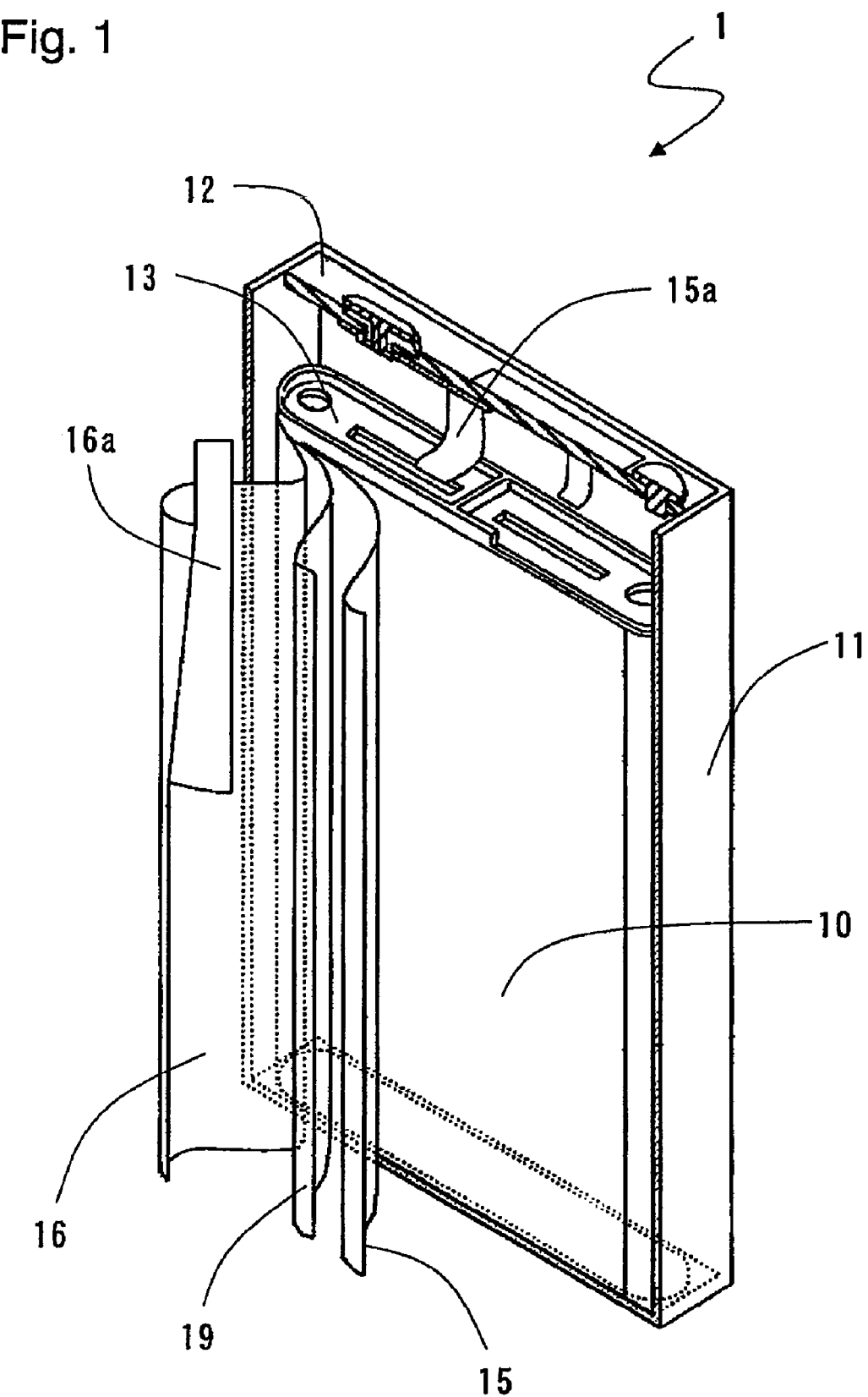
FIG. 1 is a schematic exploded perspective view of the structure of a non-aqueous electrolyte secondary battery in one Embodiment of the present invention.
Figure 2:
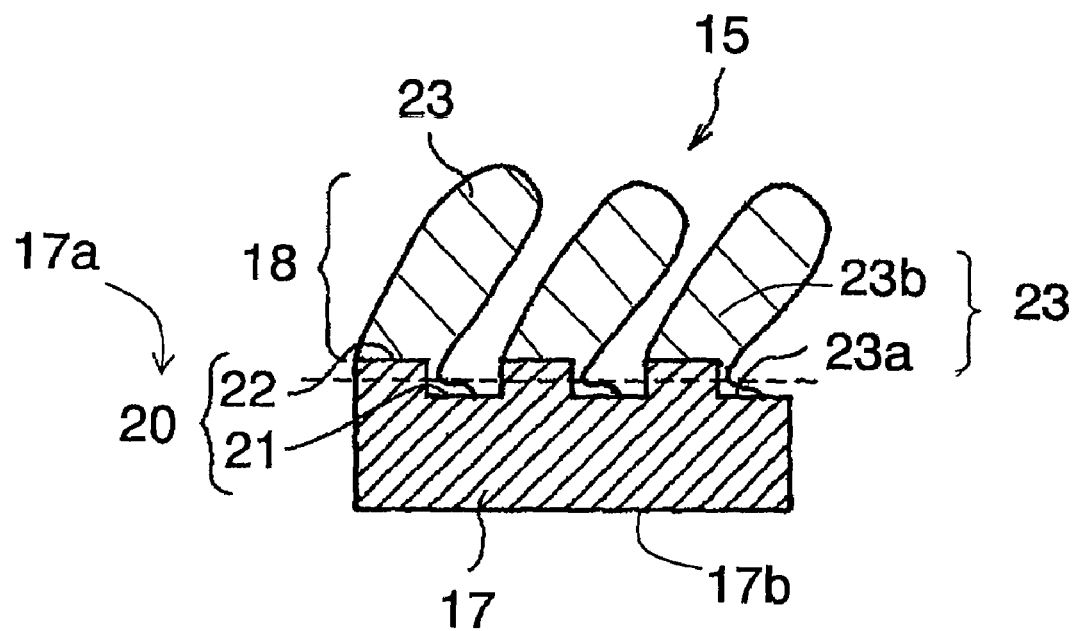
FIG. 2 is a schematic longitudinal sectional view of the structure of the negative electrode included in the non-aqueous electrolyte secondary battery illustrated in FIG. 1.
Figure 3:
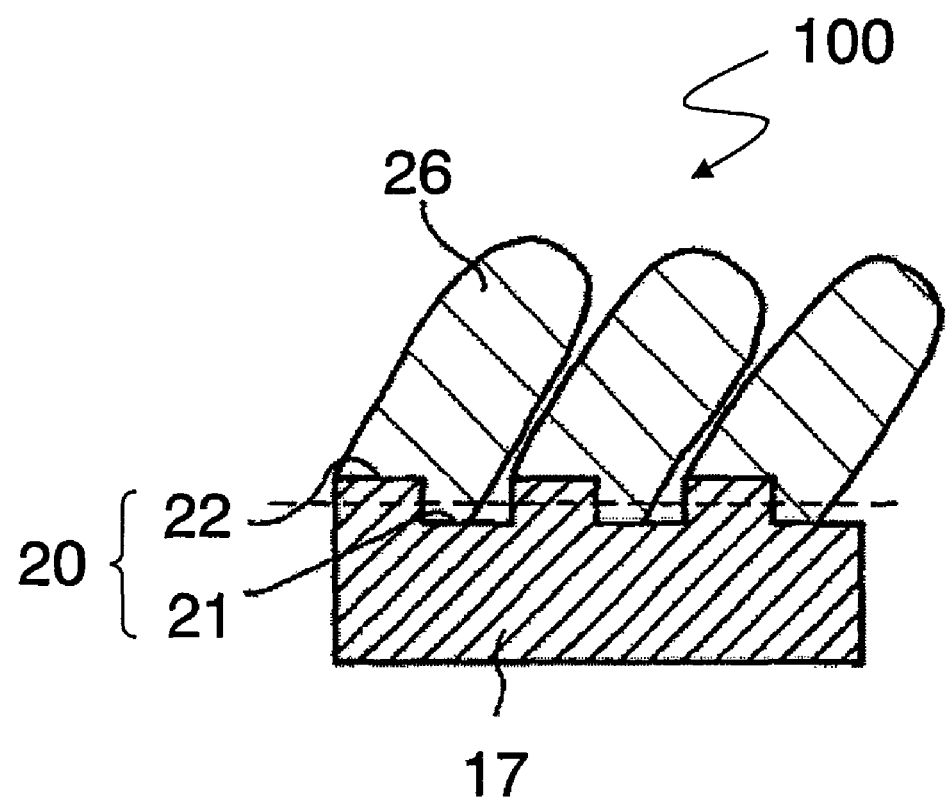
FIG. 3 is a schematic longitudinal sectional view of the structure of a comparative negative electrode.
Figure 4:
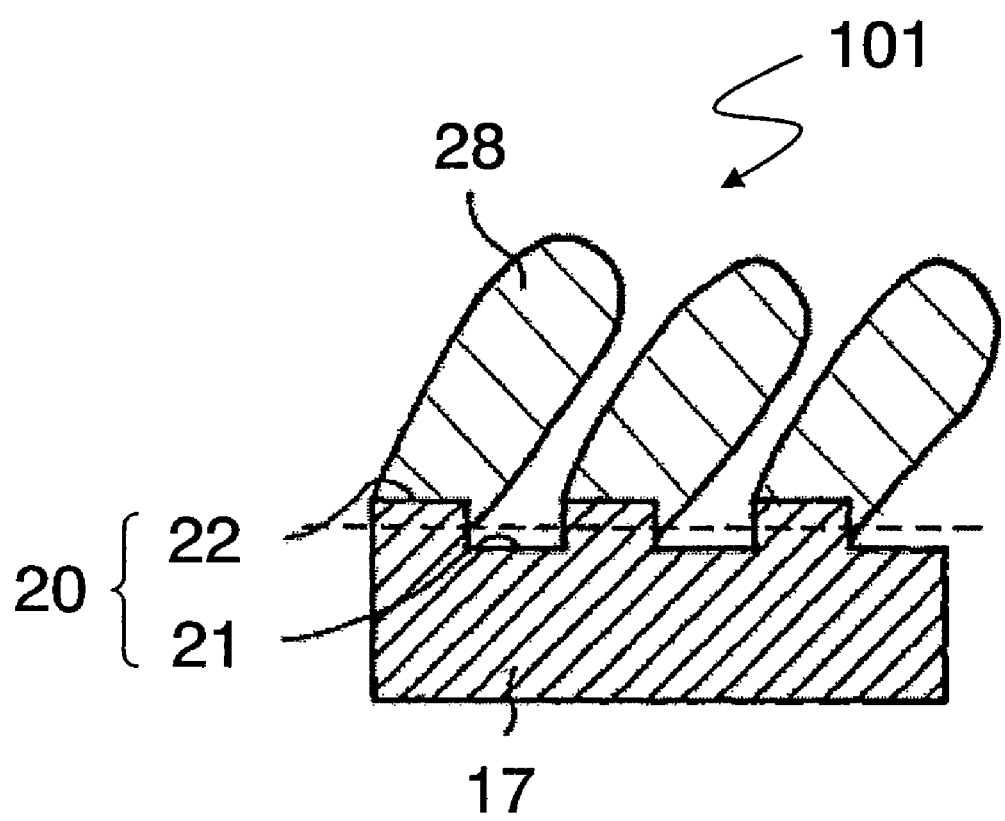
FIG. 4 is a schematic longitudinal sectional view of the structure of a comparative negative electrode in another mode.
Figure 5:
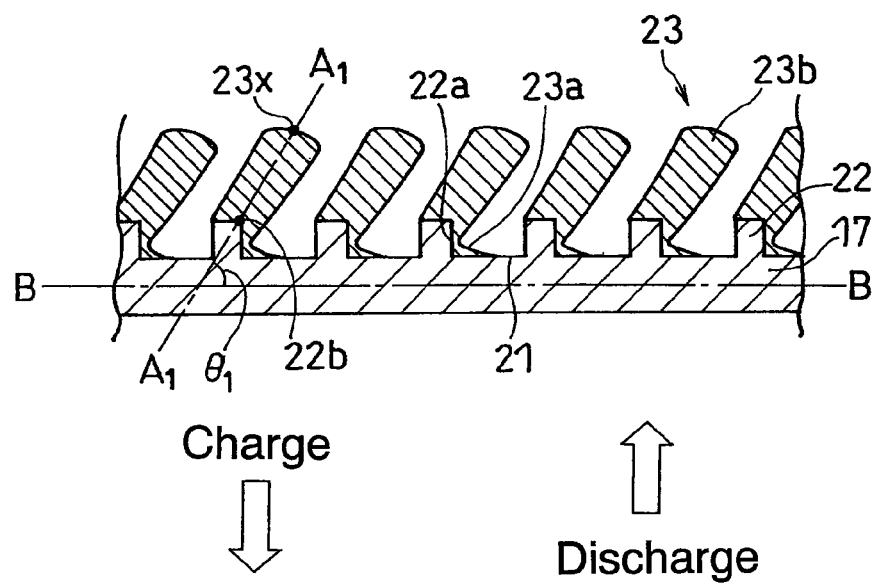
FIG. 5 are schematic longitudinal sectional views of states of the negative electrode illustrated in FIG. 2 during charging and discharging.
Figure 5:
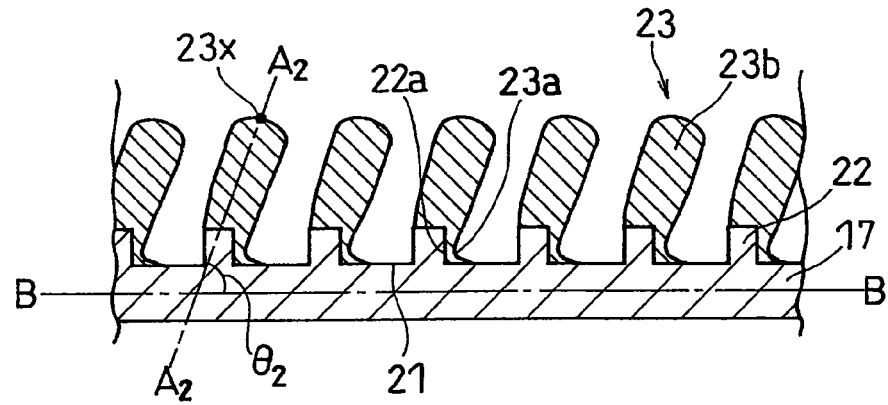
Figure 6:
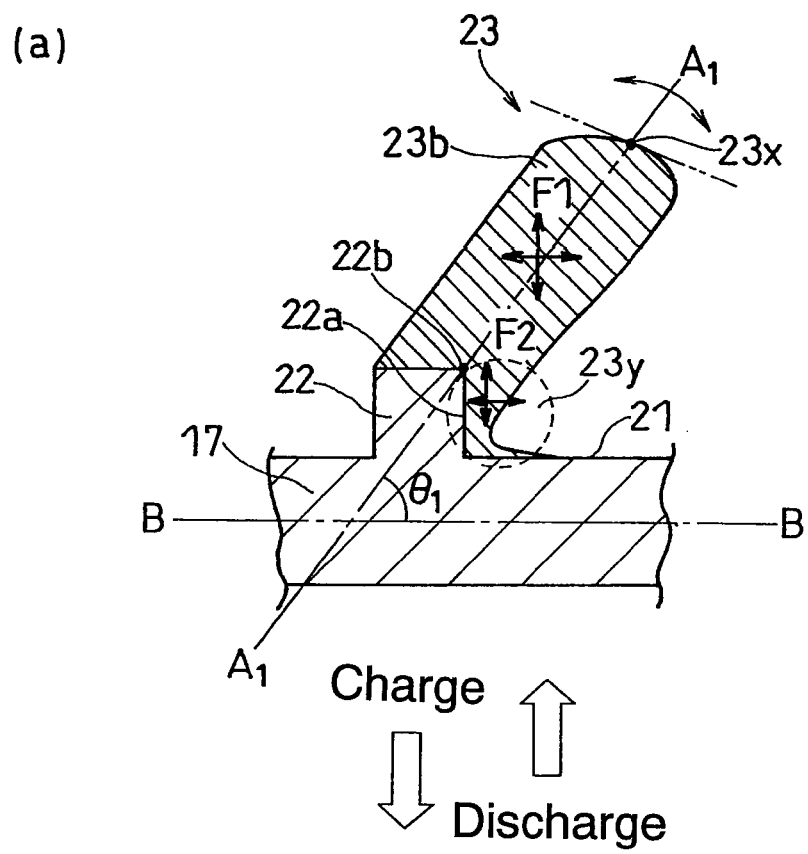
FIG. 6 are enlarged longitudinal sectional views of states of the negative electrode illustrated in FIG. 5 during charging and discharging.
Figure 6:
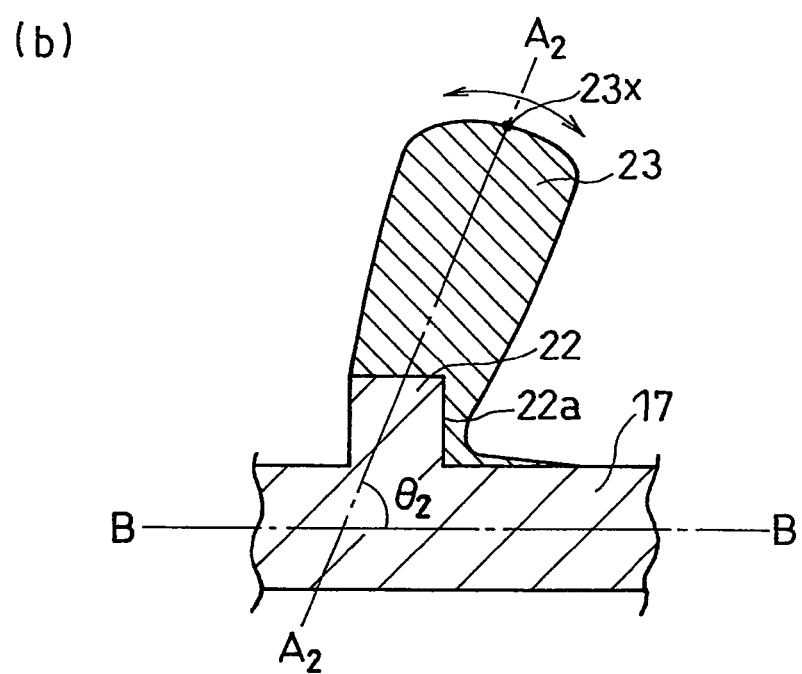

FIG. 1 is an exploded perspective view schematically showing the structure of a non-aqueous electrolyte secondary battery 1 in one Embodiment of the present invention. FIG. 2 is a longitudinal sectional view schematically showing the structure of a negative electrode 15 included in the non-aqueous electrolyte secondary battery illustrated in FIG. 1. FIG. 3 is a longitudinal sectional view schematically showing the structure of a comparative negative electrode 100. FIG. 4 is a longitudinal sectional view schematically showing the structure of a comparative negative electrode 101 in another mode. FIG. 5 are longitudinal sectional views schematically showing states of the negative electrode 15 illustrated in FIG. 2 during charging and discharging. FIG. 5(a) illustrates a state during charging and FIG. 5(b) illustrates a state during discharging. FIG. 6 are enlarged longitudinal sectional views showing states of the negative electrode 15 illustrated in FIG. 2 during charging and discharging. FIG. 6(a) illustrates a state during charging and FIG. 6(b) illustrates a state during discharging.

The non-aqueous electrolyte secondary battery 1 includes an electrode group 10, a battery case 11, a seal plate 12, an insulating gasket 13, and a non-aqueous electrolyte (not shown).

The electrode group 10, which includes the negative electrode 15, a negative electrode lead 15a, a positive electrode 16, a positive electrode lead 16a, and a 19, is housed in the battery case 11. The electrode group 10 is prepared by laminating the negative electrode 15 and the positive electrode 16 with the separator 19 interposed therebetween, winding the laminate, and electrically connecting the negative electrode lead 15a and the positive electrode lead 16a to the wound laminate. The negative electrode lead 15a is connected to a negative electrode current collector 17 included in the negative electrode 15. The positive electrode lead 16a is connected to a positive electrode current collector (not shown) included in the positive electrode 16.

The electrode group 10 and a non-aqueous electrolyte are housed in the battery case 11. Provided on top of the electrode group 10 is a resin insulating gasket 13, which separates the electrode group 10 and the seal plate 12 and separates the negative electrode lead 15a, the positive electrode lead 16a, and the battery case 11.

As illustrated in FIG. 2, FIG. 5, and FIG. 6, the negative electrode 15 includes the negative electrode current collector 17 and a negative electrode active material layer 18.

The negative electrode current collector 17 has roughness 20 on a surface 17a in the thickness direction thereof. The roughness 20 includes depressions 21 and protrusions 22 which are regularly or irregularly arranged. In FIG. 2, assume that a surface 17b opposing the surface 17a is a flat surface, and the surface 17b is a horizontal plane. At this time, in the roughness 20, the portions vertically below the average line x represented by the broken line are the depressions 21, and the portions vertically above the average line x are the protrusions 22. As used herein, the average line x is a term used to define surface roughness Ra in JIS standards (JIS B 0601-1994), and refers to a straight line determined by the average value of roughness curve. Also, in this embodiment, the roughness 20 is composed of a plurality of depressions 21 and a plurality of protrusions 22 which are alternately and regularly arranged.

The shape of the depressions 21 and the protrusions 22 and the pattern of the roughness 20 are not particularly limited. The orthographic view of the protrusion 22 from the direction perpendicular to the surface 17a is, for example, polygonal (e.g., square, rectangular, trapezoidal, rhombic, or parallelogramic), circular, oval, etc. As used herein, the direction perpendicular to the surface 17a is a direction perpendicular to a quasi-flat plane obtained by leveling the depressions 21 and the protrusions 22 of the surface 17a. The direction perpendicular thereto is synonymous with the direction of the normal thereto. It should be noted that the surface 17a of the negative electrode current collector 17 is microscopically irregular, but substantially flat when viewed visually.

Therefore, the direction perpendicular to the surface 17a of the negative electrode current collector 17 can be uniquely defined without using a quasi-flat plane. Further, the direction perpendicular to the surface 17a is substantially equal to the direction perpendicular to the surface 17b when the surface 17b opposing the surface 17a is a flat surface and a horizontal plane or a substantially horizontal plane. Also, in this embodiment, the roughness 20 is formed on one surface, i.e., 17a, but this is not construed as limiting, and it may be formed on both faces in the thickness direction.

Also, the sectional shape of the depressions 21 and the protrusions 22 in the direction parallel to the surface 17a is rectangular in FIG. 2, FIG. 5 and FIG. 6, but this is not construed as limiting, and, for example, it may be polygonal other than rectangular (e.g., square, trapezoidoidal, rhombic, or parallelogramic), dome-shaped, arched, etc. As used herein, the direction parallel to the surface 17a is a direction parallel to the quasi-flat plane obtained by leveling the depressions 21 and the protrusions 22 of the surface 17a. The direction parallel to the surface 17a is substantially equal to the direction parallel to the surface 17b when the surface 17b opposing the surface 17a is a flat surface and a horizontal plane or a substantially horizontal plane. Also, the protrusions 22 and the depressions 21 may all have the same orthographic view and sectional shape, but may have different orthographic views and/or sectional shapes.

The size of the depressions 21 and the protrusions 22 is not particularly limited, either. However, in terms of preventing deformation of the negative electrode 15 due to the expansion stress of columnar parts 23b carried on the protrusions 22, the width of each of the protrusions 22 is preferably 50 μm or less, and more preferably 1 to 20 μm. Also, in terms of securing a gap between the columnar part 23b and the adjacent columnar part 23b to ease the expansion stress for suppressing deformation of the negative electrode 15, the width of each of the depressions 21 is preferably 30% to 250%, and more preferably 50% to 200%, of the width of the protrusion 22. The width of the depression 21 and the width of the protrusion 22 are obtained from their sectional shapes. At this time, the width of the protrusion 22 is obtained as the largest width of the protrusion 22. The width of the depression 21 is obtained as the largest width of the depression 21 in the sectional shape in which the largest width of the protrusion 22 is obtained.

Also, the height of the protrusion 22 is preferably 15 μm or less, and more preferably 1 μm to 10 μm, in terms of securing mechanical strength of the protrusion 22. As used herein, the height of the protrusion 22 refers to the length from the bottom of the depression 21 to the uppermost part of the protrusion 22 in the direction perpendicular to the surface 17a.

While the material constituting the sheet portion of the negative electrode current collector 17 excluding the roughness 20 is not particularly limited, copper, a copper alloy, titanium, nickel, stainless steel, etc. are generally suitable. While the thickness of the sheet portion is not particularly limited, it is usually 1 to 80 μm, and preferably 10 to 50 μm. As the sheet material, for example, rolled copper foil, rolled copper alloy foil, electrolytic copper foil, or electrolytic copper alloy foil can be preferably used. The surface of such metal foil may be provided with a conductive base layer. The material used for the base layer is preferably, for example, copper, nickel, or cobalt. By forming the roughness 20 on the surface of such metal foil, the negative electrode current collector 17 can be obtained.

The negative electrode active material layer 18 includes a plurality of columns 23. The columns 23 have the following characteristics (1) to (3). Thus, the columns 23 exhibit such a property that the angle of its inclination relative to the direction perpendicular to the surface 17a of the negative electrode current collector 17 changes reversibly depending on the absorption and release of lithium ions by the negative electrode active material, as illustrated in FIG. 5 and FIG. 6. Also, the deformation of the negative electrode 15 due to the expansion of the columns 23, the separation of the columns 23 from the negative electrode current collector 17, etc. are prevented to such an extent that there is practically no problem.

(1) The columns 23 contain a negative electrode active material that expands and contracts repeatedly and reversibly due to the absorption and release of lithium.

Any negative electrode active material can be used without particular limitation if it expands and contracts repeatedly and reversibly due to the absorption and release of lithium. Among them, preferable materials are those having higher theoretical capacity densities of reversible lithium ion absorption and release than graphite (833 mAh/cm$^3$). Specific examples of such negative electrode active materials include silicon, silicon-containing compounds, tin, and tin-containing compounds. Examples of silicon compounds include compounds containing silicon and oxygen, compounds containing silicon, oxygen, and nitrogen, compounds containing silicon and nitrogen, compounds containing silicon and one or more selected from the other elements than the above-mentioned ones, and alloys or solid solutions. Compounds containing silicon and oxygen are preferably silicon oxides, and more preferably silicon oxides represented by the composition formula SiOx where 0<x<2. In the composition formula, the value x representing the oxygen content is preferably 0.01 to 1. Compounds containing silicon and nitrogen are preferably silicon nitrides, and more preferably, for example, silicon nitrides represented by the composition formula: SiNy 0<y<4/3. Also, the other elements than the above-mentioned ones are selected from the group consisting of, for example, Al, In, Cd, Bi, Sb, B, Mg, Ni, Ti, Mo, Co, Ca, Cr, Cu, Fe, Mn, Nb, Ta, V, W, Zn, C, N, Sn, Pb, and Ge. Alloys containing one or more such elements may be cited.

Examples of tin-containing compounds include tin, compounds containing tin and oxygen, tin-containing alloys, and tin compounds. Compounds containing tin and oxygen are preferably tin oxides, and more preferably tin oxides represented by the composition formula SnOz where 0<z<2, SnO$_2$, etc. Examples of tin-containing alloys include Ni—Sn alloy, Mg—Sn alloy, Fe—Sn alloy, Cu—Sn alloy, and Ti—Sn alloy. Examples of tin compounds include SnSiO$_3$, Ni$_2$Sn$_4$, Mg$_2$Sn, and LiSnO. Among them, for example, silicon, silicon oxides, tin, and tin oxides are preferable, and, for example, silicon and silicon oxides are particularly preferable. These negative electrode active materials can be used singly or in combination of two or more of them. Also, when compounds containing oxygen and/or nitrogen are used together with silicon or tin, two or more kinds having different compositions may be used in combination.

Also, the crystalline state of the negative electrode active material may be monocrystalline, polycrystalline, microcrystalline, or amorphous. A polycrystalline negative electrode active material contains a plurality of crystallites (crystal grains: crystallites). A microcrystalline negative electrode active material contains crystallites with a size of 100 nm or less. Whether the crystalline state of the negative electrode active material is microcrystalline or amorphous can be checked by using an X-ray diffractometer, a transmission electron microscope (TEM), etc. For example, in a diffraction pattern of the negative electrode active material layer 18 in XRD measurement, when no sharp peak appears and only a broad halo pattern appears, the negative electrode active material layer can be judged to be substantially amorphous.

(2) The columns 23 are provided in such a manner that there is a gap between adjacent columns 23.

The columns 23 are grown outwardly from the surface 17a of the negative electrode current collector 17. Also, the adjacent columns 23 are spaced apart from one another, so that gaps are provided for easing the expansion upon lithium absorption.

(3) Each of the columns 23 includes a thin film part (or base part) 23a and the columnar part 23b.

Rather than being separate, at least a part of the thin film part 23a and at least a part of the columnar part 23b are in contact with each other. In other words, the columnar part 23b is formed so as to be adjacent to the thin film part 23a. Also, the negative electrode active material contained in the thin film part 23a and the negative electrode active material contained in the columnar part 23b may be the same or different.

The thin film part 23a reversibly changes the angle of inclination of the columnar part 23b relative to the direction perpendicular to the surface 17a of the negative electrode current collector 17 (hereinafter referred to as simply the "inclination angle of the columnar part 23b"), depending on the absorption and release of lithium ions by the negative electrode active material. It also has the function of increasing the bonding strength between the negative electrode current collector 17 and the negative electrode active material layer 18 to prevent separation of the negative electrode active material layer 18 from the negative electrode current collector 17, partial exfoliation of the column 23, etc.

The thin film part 23a is a thin film including the above-described negative electrode active material, which is formed on a part of the surface of the depression 21 on the surface 17a of the negative electrode current collector 17 or formed so as to extend from a part of the surface of the depression 21 to at least a part of the side face of the adjacent columnar part 23b. If the thin film part 23a covers the whole area of the depression 21, the expansion stress of the thin film part 23a during charging is not fully eased, which may cause deformation of the negative electrode 15 such as wrinkles or breakage. To ease the expansion stress of the thin film part 23a, only a part of the depression 21 needs to be covered. The thin film part 23a may cover a part or the whole of the surface of the protrusion 22.

The thickness of the thin film part 23a is preferably 0.1 μm to 5 μm, and more preferably 1 μm to 3 μm. If the thickness of the thin film part 23a is less than 0.1 μm, the mechanical strength of the thin film part 23a becomes low, which may result in breakage. In this case, the effect of increasing the bonding strength between the negative electrode current collector 17 and the negative electrode active material 18 may decrease. Hence, the portion having a film thickness of less than 0.1 μm cannot be substantially regarded as the thin film part 23a. On the other hand, if the thickness of the thin film part 23a exceeds 5 μm, the expansion stress of the thin film part 23a during charging/discharging increases, which may cause deformation of the negative electrode 15 such as wrinkles or breakage.

It should be noted that the thickness, shape, etc. of the thin film part 23a can be controlled by appropriately adjusting the incident angle of the vapor of the negative electrode active material with the surface of the protrusion 22 in the oblique evaporation method utilizing, for example, sputtering or vacuum deposition which will be described later.

The columnar part 23b includes the above-described negative electrode active material. It is grown outwardly from at least a part of the surface of the protrusion 22 or at least a part of the surface of the protrusion and a part of the surface of the adjacent thin film part 23a. Also, the columnar part 23b is inclined at an angle relative to the direction perpendicular to the surface 17a of the negative electrode current collector 17. The inclination angle of the columnar part 23b relative to the direction perpendicular to the surface 17a of the negative electrode current collector 17 changes reversibly, depending on the absorption and release of lithium ions by the negative electrode active material.

While the inclination angle θ of the columnar part 23b can be appropriately selected within the range from greater than 0° and less than 90°, it is preferably 10° to 80°. By inclining the columnar part 23b at the inclination angle θ, the orthogonally projected area of the negative electrode active material layer 18 increases. The proportion of the exposed parts of the negative electrode current collector 17 in the orthographic view decreases or reaches zero. As a result, the possibility that lithium will deposit on the negative electrode current collector 17 becomes low, and the coulombic efficiency of the battery increases. That is, uneven electrode reaction is suppressed and the charge/discharge cycle characteristics improve. In particular, a rapid degradation in cycle characteristics in large-current, high-rate charge/discharge is significantly suppressed. If the inclination angle θ is less than 10°, the effect of inclining the columnar part 23b may be insufficient. Also, if the inclination angle θ exceeds 80°, it gradually becomes difficult for the columnar part 23b to be carried on the negative electrode current collector 17. It should be noted that the inclination angle θ of the columnar part 23b is equal to or substantially equal to the inclination angle θ of the column 23. The inclination angle θ of the column 23 will be defined later.

The inclination angle θ of the columnar part 23b is synonymous with the angle formed between the grow direction of the columnar part 23b and the direction perpendicular to the surface 17a of the negative electrode current collector 17. When the columnar part 23b is grown by deposition or sputtering, the grow direction of the columnar part 23b is determined by the angle α formed between a horizontal plane and the surface 17a of the negative electrode current collector 17 onto which the columnar part 23b is grown. At this time, a deposition source or target is placed, for example, vertically below the negative electrode current collector 17, and the angle α and the incident angle φ of the active material source with the direction perpendicular to the surface 17a are equal to the inclination angle θ. Thus, the angle α, the incident angle φ, and the inclination angle θ satisfy the relation: $\tan \alpha = \tan \phi = 2 \tan \theta$. However, this relation may not hold when gas such as oxygen or nitrogen is introduced in performing deposition.

While the inclination angle θ of the columnar part 23b can be obtained from the above-mentioned relation between the inclination angle θ and the angle α, it can also be obtained by using an electron microscope (e.g., SEM). For example, using at least 10 columnar parts 23b, the angle formed between each of them and the direction perpendicular to the surface 17a of the negative electrode current collector 17 is measured, and the average value of the measured values can be used as the inclination angle θ. More specifically, in a cross-section of the negative electrode 15 in the thickness direction thereof, the average line corresponding to the surface of the negative electrode current collector 17 and the average line corresponding to the surface of the negative electrode active material layer 18 are obtained. A straight line L equidistant from these two average lines is then obtained. The straight line L intersects with the curve representing the surface or contour of each columnar part 23b at two points.

At each of the two points of intersection, a tangent to the curve representing the surface of the columnar part 23b is obtained. Then, the angle θ1 and the angle θ2 formed between these tangents and the direction perpendicular to the surface 17a of the negative electrode current collector 17 can be obtained. The inclination angle θ of the columnar part 23b can be obtained as the average value of the angle θ1 and the angle θ2.

It should be noted that the inclination angle θ tends to gradually decrease as the battery is charged/discharged. It is thus preferable to measure the inclination angle θ using an electrode immediately after the production thereof, a negative electrode included in an unused battery immediately after the production thereof, or the negative electrode 15 included in a battery that has been subjected to a charge/discharge only 10 times or less.

The state of inclination of the columnar part 23b may be different or the same depending on the position of the negative electrode active material layer 18. When the negative electrode active material layer 18 is formed on each of the two faces 17a and 17b of the negative electrode current collector 15 in the thickness direction thereof, the states of inclination of the columnar parts 23b included in the negative electrode active material layers 18 on the two faces may be the same or different.

The columnar part 23b does not need to be a completely cylindrical or prismatic particle. The shape of the columnar part 23b is not particularly limited and can be substantially columnar; it may be curved or bent. When the columnar part 23b has one or more bends, any one of the respective regions divided by the bend(s) should be inclined relative to the direction perpendicular to the surface of the negative electrode current collector 17. The inclination angle θ of the regions is preferably 10° to 80°, as described above. The columnar parts 23b having different shapes may be present. The diameter (thickness) of the columnar part 23b may change in the length direction thereof. For example, the diameter of the columnar part 23b may increase as the distance from the current collector increases.

The diameter of the columnar part 23b is not particularly limited. However, there is a need to prevent cracking of the columnar part 23b due to expansion during charging, separation of the column 23b from the surface 17a of the negative electrode current collector 17, etc. In such respects, when the negative electrode active material contains or does not contain lithium corresponding to irreversible capacity, the diameter of the columnar part 23b is preferably 50 μm or less, and more preferably 1 to 20 μm. The diameter of the columnar part 23b can be obtained, for example, by obtaining the diameter of each of the columnar parts 23b at the center height thereof in a cross-section of the negative electrode 15 in the thickness direction thereof and averaging the obtained values. As used herein, the center height refers to the height corresponding to the above-mentioned straight line L. Also, the diameter, as used herein, refers to the width perpendicular to the grow direction of the columnar part 23b. In other words, it is the largest width in the orthographic view of the columnar part 23b from the direction perpendicular to the surface 17a of the negative electrode current collector 17.

The column 23 of such structure may be formed so that the content of element(s) in the negative electrode active material changes continuously or non-continuously toward the grow direction of the column 23. For example, a silicon oxide is used as the negative electrode active material, and the oxygen content is gradually decreased. In this case, the inclination angle θ of the column 23 can be reversibly changed in a more reliable manner.

In order to clarify the characteristics of the columns 23, a comparison is made with negative electrodes 100 and 101 illustrated in FIG. 3 and FIG. 4. Since the negative electrodes 100 and 101 are similar to the negative electrode 15, corresponding components are given the same reference characters and their descriptions are omitted.

The negative electrode 100 is characterized by columns 26. The area of the columns 26 in contact with the surface 17a is substantially equal to that of the columns 23 of the negative electrode 15. However, each of the columns 26 is formed so as to extend outwardly from a part of the surface of the protrusion 22 and a part of the surface of the adjacent depression 21 of the negative electrode current collector 17. The portion on the surface of the depression 21 is not in the shape of a thin film. Also, the width (thickness) of the columns 26 in the direction perpendicular to the grow direction thereof is greater than that of the columns 23, so that the interval between the columns 26 is smaller. Thus, the inclination angle of the columns 26 hardly changes reversibly, and the surface 17a of the negative electrode current collector 17 is exposed toward the positive electrode 16, so that lithium inevitably deposits thereon upon charge. Also, when the negative electrode active material expands, the expansion stress cannot be sufficiently eased. As a result, upon charge/discharge, the negative electrode 100 may be subject to deformation such as wrinkles or breakage.

The negative electrode 101 is characterized by columns 28. Each of the columns 28 is formed so as to extend outwardly from a part of the surface of the protrusion 22 of the negative electrode current collector 17. Hence, the area in contact with the surface 17a of the negative electrode current collector 17 is smaller than that of the columns 23. As a result, the columns 28 are more likely to become separated from the surface 17a than the columns 23. Also, the width (thickness) in the direction perpendicular to the grow direction is equivalent to that of the columns 23, which is effective for easing the expansion stress. However, the columns 28 do not have the thin film parts 23a of the columns 23. Thus, the inclination angle of the columns 28 hardly changes reversibly, and the surface 17a of the negative electrode current collector 17 is exposed toward the positive electrode 16, so that lithium inevitably deposits thereon upon charge.

Next, based on FIG. 5 and FIG. 6, the reversible change of inclination angle of the columns 23 of the negative electrode 15 of the present invention is described more specifically. FIG. 5(a) and FIG. 6(a) illustrate a state of the columns 23 before charge (after discharge). FIG. 5(b) and FIG. 6(b) illustrate a state of the columns 23 after charge (before discharge).

First, in FIG. 5(a) and FIG. 6(a) illustrating a state before charge, the end of the top face of the protrusion 22 on the inclination side of the column 23 is designated as an end point 22b. Also, at the end of the column 23 in the grow direction thereof, the furthest point from an end 22a is designated as the furthest point 23x. A line connecting the furthest point 23x and the end point 22b (alternate long and short dashed lines) is extrapolated as a center line $A_1$-$A_1$ of the column 23. Also, a center line B-B of the negative electrode current collector 17 in the thickness direction thereof is extrapolated. When the surfaces 17a and 17b of the negative electrode current collector 17 are flat planes or quasi-flat planes, the center line B-B is parallel to the surfaces 17a and 17b. The angle formed by the center line $A_1$-$A_1$ and the center line B-B (the line parallel to the surface of the negative electrode current collector 17 is designated as the center line) that intersect is the inclination angle θ. The inclination angle θ before charge is designated as $θ_1$, and the largest inclination angle θ after charge is designated as $θ_2$.

The center line $A_1$-$A_1$ of the column 23 changes in position before and after charge. On the other hand, the B-B of the negative electrode current collector 17 does not change before and after charge. According to the present invention, the inclination angle θ is determined based on the center line $A_1$-$A_1$ of the column 23 before charge and the center line B-B of the negative electrode current collector 17. That is, before charge, the center line $A_1$-$A_1$ and the center line B-B are determined, and the intersection point k thereof is determined. When the column 23 gradually stands up due to charge, the inclination angle θ is defined as the angle formed between the center line B-B and the straight line $A_2$-$A_2$ connecting the intersection point k and the furthest point 23x of the column 23 furthest from the intersection point k.

When the column 23 absorbs lithium ions during battery charge, it expands and increases in volume. Commensurately therewith, the inclination angle of the column 23 gradually increases from $θ_1$ before charge to $θ_2$ in the fully charged state. At this time, $θ_1<θ_2$. As a result, the column 23 stands up leftward as shown by the arrow in FIG. 6. Also, during discharging, due to the release of lithium ions, the active material of the column 23 shrinks in volume, and thus the column 23 inclines rightward as shown by the arrow in FIG. 6, so that the inclination angle changes from $θ_2$ to $θ_1$.

The reversible change of the inclination angle θ of the column 23 occurs probably due to the following mechanism.

During charging, the column 23 expands and increases in volume due to the absorption of lithium ions released from the positive electrode. At this time, as illustrated in FIG. 6(a), mainly expansion stress F1 is created inside the whole column 23, thereby expanding the column 23.

Meanwhile, expansion stress F2 is also exerted on the thin film part 23a. However, the expansion stress F2 created in the thin film part 23a is prevented by a side face 22a of the protrusion 22 and the depression 21 of the negative electrode current collector 17 from expanding in these directions, so that unusually large expansion stress F2 is exerted on the columnar part 23a. As a result, the expansion stress on the side of the acute angle (inclination angle $θ_1$) formed between the center line $A_1$-$A_1$ of the column 23 and the center line B-B of the negative electrode current collector 17 becomes greater than that on the side of the obtuse angle (180–$θ_1$) formed between the center line $A_1$-$A_1$ and the center line B-B. Thus, the amount of expansion of the column 23 on the acute angle side becomes greater than the amount of expansion on the obtuse angle side. Probably for this reason, as illustrated in FIG. 6(b), the inclination angle of the column 23 changes from $\theta_1$ and $\theta_2$ due to the leftward moment shown by the arrow.

Figure 7:
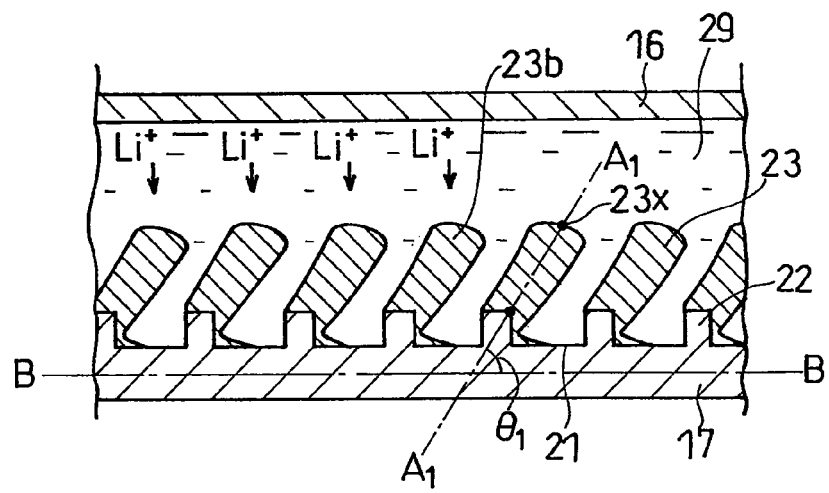
FIG. 7 are enlarged longitudinal sectional views of the structure of the main part of the electrode group included in the non-aqueous electrolyte secondary battery illustrated in FIG. 1.
Figure 7:
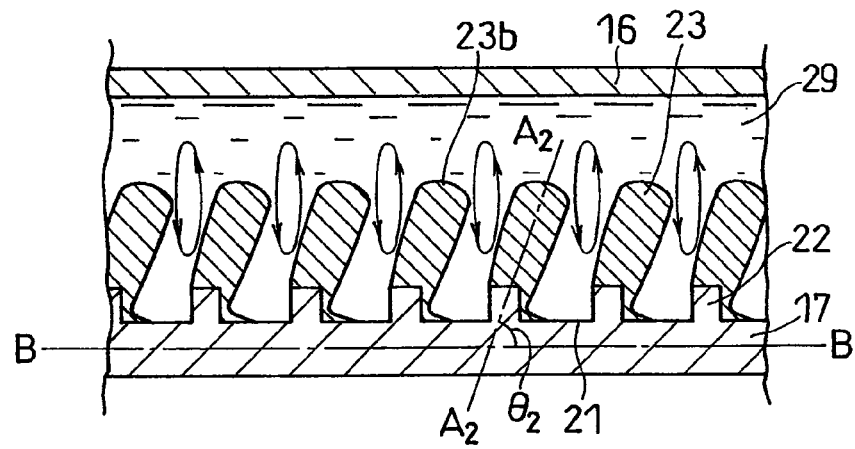

Further, since the reversible change ($\theta_1 \leftrightarrow \theta_2$) of the inclination angle $\theta$ of the column 23 due to charge/discharge has a large impact on the effect of the present invention, the function thereof is described based on FIG. 7. FIG. 7 are enlarged longitudinal sectional views of the structure of the main part of the electrode group 10 included in the non-aqueous electrolyte secondary battery 1 illustrated in FIG. 1. FIG. 7(a) illustrates a state when a charge is started, and FIG. 7(b) illustrates a state when the charge is fully completed and a discharge is started. In FIG. 7, the separator 17 is not illustrated.

Generally, when using a negative electrode having an exposed part of a negative electrode current collector on the face opposing a positive electrode, lithium ions released from the positive electrode during charging are absorbed in the negative electrode active material. At the same time, part of the lithium ions directly reach the negative electrode current collector and deposit as lithium metal. This can cause degradation of battery performance such as safety and charge/discharge characteristics.

In this embodiment, as illustrated in FIG. 7(a), upon the start of a charge, the columns 23 are formed on the protrusions 22 of the negative electrode current collector 17 slantwise at the inclination angle $\theta_1$. In an orthographic view from the direction perpendicular to the surface 17a of the negative electrode current collector 17, the columns 23 shield the depressions 21 of the negative electrode current collector 17 from the positive electrode 16. Hence, the lithium ions released from the positive electrode 16 during charging are prevented by the columns 23 from directly reaching the depressions 21 of the negative electrode current collector 17, and most of them are absorbed in the columns 23. As a result, deposition of lithium metal is suppressed.

Also, in the negative electrode 15, as shown by the circular broken line 23y in FIG. 6(a), the thin film part 23a, which is a part of the column 23, is formed on not only the side face 22a of the protrusion 22 of the negative electrode current collector 17 but also a part of the surface of the depression 21 of the negative electrode current collector 17. Thus, deposition of lithium metal on the surface of the depression 21 of the negative electrode current collector 17 can be suppressed more efficiency.

Also, the inclination angle $\theta$ of the column 23 gradually increases from $\theta_1$ in the initial stage of charge as the charge proceeds, and the column 23 stands up. Commensurately therewith, the state of the depression 22 shielded by the column 23 changes and the exposed part of the depression 21 facing the positive electrode 16 increases. However, when the inclination angle $\theta$ of the column 23 approaches the fully charged state $\theta_2$, the charge current is low, and therefore, the possibility that the lithium ions coming straight from the positive electrode 16 deposit on the negative electrode current collector 17 as lithium metal is extremely low.

Further, since the columnar part 23b of the column 23 is independently formed mainly on the surface of the protrusion 22, it does not cause the negative electrode current collector 17 deformation such as wrinkles or separation even if the whole column 23 expands due to the absorption of lithium ions.

Also, as illustrated in FIG. 7(b), when the fully charged battery is discharged, the columns 23 stand up at the inclination angle $\theta_2$. In this state, the average distance between the positive electrode 16 and the surface of the active material which releases lithium ions is short, compared with the state when the inclination angle $\theta$ of the columns 23 is $\theta_1$. Hence, large-current discharge (high-rate discharge) becomes easy. Further, a non-aqueous electrolyte 29 present among the respective columns 23 can easily circulate by convection as shown by the arrow in the figure, and the movement of the non-aqueous electrolyte 29 is not hampered. It is therefore possible to significantly improve the charge/discharge characteristics particularly at low temperatures.

In this embodiment, the inclination angle $\theta$ of the columns 23 can be freely designed depending on the shape of and the interval between the protrusions 22 of the negative electrode current collector 17. As an example, when the interval between the protrusions 22 is 20 µm, the columns 23 are preferably formed on the protrusions 22 at 45° to 60° in such a manner that the distance from the end point 22b to the furthest point 23x is at least 30 µm or more, but this is not construed as limiting. In this case, the columns 23 can shield the surface of the negative electrode current collector 17 so that it cannot be directly seen from the positive electrode 17, and therefore, the deposition of lithium metal on the negative electrode current collector 17 can be effectively prevented.

The negative electrode active material layer 18 is described again.

The thickness of the negative electrode active material layer 18 is preferably 5 µm to 100 µM, and more preferably 5 µm to 50 µm, in both cases the negative electrode active material contains and does not contain lithium corresponding to irreversible capacity. When the thickness of the negative electrode active material layer 18 is in this range, the negative electrode 15 with high energy density and high capacity can be obtained. Thus, the high capacity of the negative electrode active material itself can be fully utilized. Also, the ratio of the columnar parts 23b shielded by the other columnar parts 23b can be made low. The resistance to current collection from the columnar parts 23b can also be made low. It is therefore advantageous to high-rate charge/discharge. If the thickness of the negative electrode active material layer 18 is less than 5 µm, the capacity of the negative electrode 15 may become low. Also, if the thickness of the negative electrode active material layer 18 exceeds 100 µM, the ratio of the columnar parts 23b shielded by the other columnar parts 23b increases, so that large-current discharge may become insufficient.

The thickness of the negative electrode active material layer 18 is the distance from the average line of the surface 17a of the negative electrode current collector 17 to the uppermost surface of the negative electrode active material layer 18 in a cross-section of the negative electrode 15 in the thickness direction thereof. However, the thickness can be calculated in a simple manner by measuring the thickness of the negative electrode 15 and the thickness of the negative electrode current collector 17 using a common thickness gauge, and calculating the difference between the thickness of the negative electrode 15 and the thickness of the negative electrode current collector 17. It has been experimentally clear that the calculation result thus obtained is in substantial agreement with the thickness measured precisely by using the average lines. In the case of using a common thickness gauge, the difference between the thickness up to the uppermost face of the protrusion 22 of the negative electrode current collector 17 and the thickness up to the uppermost face of the negative electrode active material layer 18 is the thickness of the negative electrode active material layer 18. In this case, the sum of "the distance from the uppermost face of the current collector to the uppermost face of the active material layer" and "the distance from the average line representing the surface of the current collector to the uppermost face of the current collector" is "the distance from the average line representing the surface of the current collector to the uppermost face of the active material layer".

Also, the area of the contact portions of the negative electrode current collector 17 and the negative electrode active material layer 18 orthogonally projected from the direction perpendicular to the surface 17a of the negative electrode current collector 17 is preferably 60% or more and less than 100% of the orthogonally projected area of the surface 17a carrying the negative electrode active material layer 18, and more preferably 60% or more and 80% or less. As used herein, the contact portions of the negative electrode current collector 17 and the negative electrode active material layer 18 refer to the total of the contact portions of the thin film parts 23a and the negative electrode current collector 17 and the contact portions of the columnar parts 23b and the negative electrode current collector 17. If the orthogonally projected area of the contact portions of the negative electrode current collector 17 and the negative electrode active material layer 18 is less than 60% of the orthogonally projected area of the surface 17a, the contact area of the negative electrode current collector 17 and the negative electrode active material layer 18 is small, and thus the effect of enhancing the bonding strength lowers. Also, by setting the orthogonally projected area of the contact portions of the negative electrode current collector 17 and the negative electrode active material layer 18 to 80% or less of the orthogonally projected area of the surface 17a, the expansion stress of the thin film parts 23a carried on the depressions 21 can be effectively eased.

Figure 8:
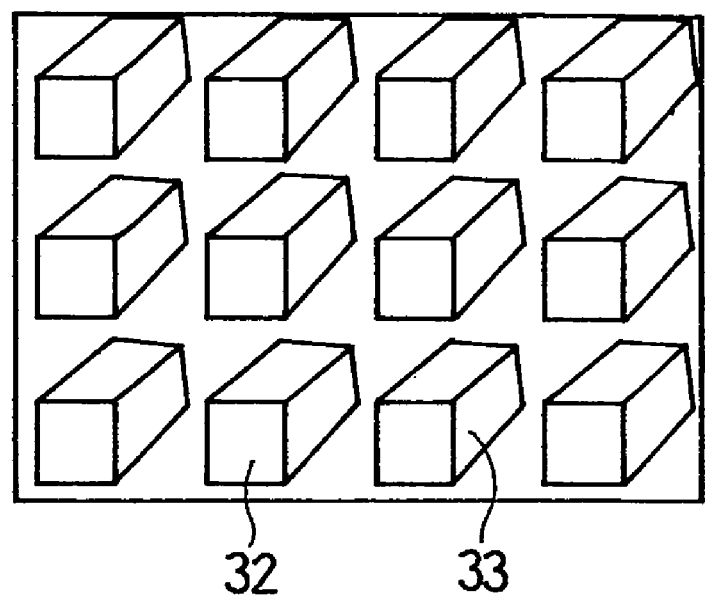
FIG. 8 is a schematic top view of the orthogonally projected areas of the contact portions of the negative electrode current collector and the negative electrode active material layer.

FIG. 8 is a schematic top view of the orthogonally projected areas of the contact portions of the negative electrode current collector 17 and the negative electrode active material layer 18. The portions where oblique lines were given (the total of the area of a top face 32 of each of the protrusions 22 in contact with the columnar part 23b or the thin film part 23a and the area of a surface 33 of each of the depressions 21 in contact with the thin film part 23a) correspond to the orthogonally projected areas of the contact portions of the negative electrode current collector 17 and the negative electrode active material layer 18. The orthogonally projected areas can be obtained, for example, by grinding the negative electrode active material layer 18 up to the vicinity of the protrusions 22 of the negative electrode current collector 17, observing the negative electrode current collector 17 from the vertical direction, measuring the whole area of the negative electrode current collector 17 and the area of the exposed parts of the negative electrode current collector 17 to which the negative electrode active material layer 18 is not adhered, and calculating the difference (the whole area minus the exposed area).

By adjusting the porosity of the negative electrode active material layer 18, the contact area of the negative electrode active material contained in the columns 23 and the non-aqueous electrolyte can be increased. This is also advantageous in terms of easing the expansion stress of the negative electrode active material. The porosity P of the negative electrode active material layer 18 is preferably 30% to 70%, and more preferably 40% to 60%. When the porosity P is in this range, the stress created by the expansion and contraction of the negative electrode active material can be fully eased. Also, sufficient contact area of the negative electrode active material and the non-aqueous electrolyte can be obtained. Also, even if the porosity P exceeds 70%, such electrode can be preferably used depending of the use of the battery, but the energy density of the electrode becomes low. Also, the porosity P as used herein is a value measured when the negative electrode active material layer 18 does not contain lithium corresponding to irreversible capacity.

The porosity and thickness of the negative electrode active material layer 18 are desirably measured in the fully discharged state. The fully discharged state refers to the state in which the negative electrode active material contains lithium corresponding to irreversible capacity and does not contain lithium corresponding to reversible capacity (reversible capacity is 0). The fully discharged state corresponds to the state in which the volume of the negative electrode active material layer 18 is smallest in the completed battery. It is also preferable to measure the size of the columns 23 in the fully discharged state.

In the case of measuring the porosity P and thickness of the negative electrode active material layer 18 that does not contain lithium corresponding to irreversible capacity, the measured values are corrected to obtain values for the fully discharged state. For example, the value of the porosity P can be corrected by using the difference $\Delta V$ between the volume of the negative electrode active material layer 18 in the fully discharged state and the volume of the negative electrode active material layer 18 that contains no lithium. The porosity P' in the fully discharged state can be obtained from P'=P−$\Delta V$. The porosity P' of the negative electrode active material layer 18 in the fully discharged state is preferably 5% to 60%, and more preferably 20% to 55%, 20% to 50%, or 30% to 50%.

The porosity P of the negative electrode active material layer 18 can be calculated, for example, from the following formula:

$$P(\%)=100[\{ST-(W/D)\}/ST]$$

where S represents the area of the surface 17a of the negative electrode current collector 17 carrying the negative electrode active material layer 18, T represents the thickness of the negative electrode active material layer 18, W represents the weight of the negative electrode active material layer 18, and D represents the density of the negative electrode active material.

Also, the porosity P of the negative electrode active material layer 18 can be measured more accurately by using a porosimeter utilizing gas absorption or mercury intrusion. In measurements using a mercury porosimeter, the porosity P can be calculated from the following formula:

$$P(\%)=100\{VH/(VT+VH)\}$$

where VH represents the volume of mercury having intruded into the pores of the negative electrode active material layer 18, VH includes the volume of mercury having intruded into the depressions 21 of the surface 17a of the negative electrode current collector 17, VT represents the true volume of the negative electrode active material layer 18, and the true volume of the negative electrode active material layer 18 can be calculated from the weight of the negative electrode active material layer 18 and the specific gravity of the negative electrode active material.

The porosity P is measured by using a sample cut out from a portion where the negative electrode active material layer 18 is evenly formed on the surface of the negative electrode current collector 17. The sample may be cut out from a portion where the negative electrode active material layer 18 is formed on both faces, or the sample may be cut out from a portion where the negative electrode active material layer 18 is formed on one face.

Hereinafter, the constituent elements of the non-aqueous electrolyte secondary battery 1 illustrated in FIG. 1 other than the negative electrode 15 are described again. The production method of the negative electrode will be described later.

The positive electrode 16 includes a positive electrode active material layer and a positive electrode current collector, which are not shown in the FIG. 1. The positive electrode active material layer is provided on both faces or one face of the positive electrode current collector in the thickness direction thereof. The positive electrode active material layer contains a positive electrode active material, and if necessary, a conductive agent, a binder, etc. The positive electrode active material can be any material commonly used in this field, and examples include lithium-containing composite oxides such as $LiCoO_2$, $LiNiO_2$, and $Li_2MnO_4$, olivine-type lithium phosphates represented by the general formula $LiM^1PO_4$, $M^1$=V, Fe, Ni, Mn, lithium fluorophosphates represented by the general formula $Li_2M^2PO_4F$, $M^2$=V, Fe, Ni, Mn, and compounds obtained by replacing part of such lithium-containing compounds with other element(s). Among them, lithium-containing composite oxides are preferred. The surface of the positive electrode active material may be treated with a metal oxide, lithium oxide, conductive agent, etc., or the surface may be subjected to a hydrophobic treatment. These positive electrode active materials can be used singly or in combination of two or more of them.

Examples of conductive agents include graphites such as natural graphite and artificial graphite, carbon blacks such as acetylene black, ketjen black, channel black, furnace black, lamp black, and thermal black, conductive fibers such as carbon fiber and metal fiber, carbon fluoride, metal powders such as aluminum, conductive whiskers such as zinc oxide and potassium titanate, conductive metal oxides such as titanium oxide, and organic conductive materials such as phenylene derivatives. These conductive agents can be used singly or in combination of two or more of them.

Examples of binders include PVDF, polytetrafluoroethylene, polyethylene, polypropylene, aramid resin, polyamide, polyimide, polyamide-imide, polyacrylonitrile, polyacrylic acid, polymethyl acrylates, polyethyl acrylates, polyhexyl acrylates, polymethacrylic acid, polymethyl methacrylates, polyethyl methacrylates, polyhexyl methacrylates, polyvinyl acetate, polyvinyl pyrrolidone, polyethers, polyethersulfone, polyhexafluoropropylene, styrene butadiene rubber, and carboxymethyl cellulose. As the binder, it is also possible to use a copolymer of two or more monomer compounds selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ethers, acrylic acid, and hexadiene. These binders can be used singly or in combination of two or more of them.

The positive electrode current collector can be any material commonly used in this field, and examples include porous or non-porous conductive substrates made of metal materials such as stainless steel, titanium, aluminum, and aluminum alloys, carbon materials, or conductive resin. Examples of porous conductive substrates include mesh, net, punching sheets, lath, porous material, foam, and molded fibers (non-woven fabric and the like). Examples of non-porous conductive substrates include foil, sheets, and films. While the thickness of the porous or non-porous conductive substrate is not particularly limited, it is usually 1 to 500 μm, preferably 1 to 50 μm, more preferably 10 to 40 μm, and most preferably 10 to 30 μm.

The separator 19 can be any material commonly used in this field, and an example is a porous film made of a synthetic resin. Examples of synthetic resins include polyolefins such as polyethylene and polypropylene, aramid resin, polyamide-imide, polyphenylene sulfide, and polyimide. Examples of porous films include micro-porous films and non-woven fabric. Also, the separator 19 may have a heat-resistant filler such as alumina, magnesia, silica, or titania therein or thereon.

Also, one face or both faces of the separator 19 in the thickness direction thereof may be provided with a heat-resistant layer. The heat-resistant layer contains, for example, the heat-resistant filler and a binder. The binder may be the same as that used in the positive electrode active material layer. Also, the thickness of the separator 19 is preferably about 10 μm to 30 μm.

The non-aqueous electrolyte can be an electrolyte solution composed of a solute dissolved in an organic solvent, a polymer electrolyte or solid electrolyte that contains a solute and an organic solvent, and is non-fluidized with a high molecular compound, or the like. In the case of using an electrolyte solution, it is preferable to impregnate the separator 17 with the electrolyte solution. The non-aqueous electrolyte may contain additives in addition to the solute, organic solvent and high molecular compound.

The solute is selected based on the oxidation reduction potential of the active material, etc. Specifically, the solute can be any solute commonly used in the field of lithium batteries, and examples include $LiPF_6$, $LiBF_4$, $LiClO_4$, $LiAlCl_4$, $LiSbF_6$, LiSCN, $LiCF_3SO_3$, $LiN(CF_3CO_2)$, $LiN(CF_3SO_2)_2$, $LiAsF_6$, $LiB_{10}Cl_{10}$, lithium lower aliphatic carboxylates, LiF, LiCl, LiBr, LiI, chloroborane lithium, borates such as lithium bis(1,2-benzenediolate(2-)-O,O')borate, lithium bis(2,3-naphthalenediolate(2-)-O,O')borate, lithium bis(2,2'-biphenyldiolate(2-)-O,O')borate, lithium bis(5-fluoro-2-olate-1-benzenesulfonic acid-O,O')borate, $(CF_3SO_2)_2NLi$, $LiN(CF_3SO_2)(C_4F_9SO_2)(C_2F_5SO_2)_2NLi$, and lithium tetraphenylborate. These solutes can be used singly or, if necessary, in combination of two or more of them.

The organic solvent can be any organic solvent commonly used in the field of lithium batteries, and examples include ethylene carbonate (EC), propylene carbonate, butylene carbonate, vinylene carbonate, dimethyl carbonate (DMC), diethyl carbonate, ethyl methyl carbonate (EMC), dipropyl carbonate, methyl formate, methyl acetate, methyl propionate, ethyl propionate, dimethoxyethane, γ-butyrolactone, γ-valerolactone, 1,2-diethoxyethane, 1,2-dimethoxyethane, ethoxymethoxyethane, trimethoxymethane, tetrahydrofuran derivatives such as tetrahydrofuran and 2-methyltetrahydrofuran, dimethyl sulfoxide, dioxolane derivatives such as 1,3-dioxolane and 4-methyl-1,3-dioxolane, formamide, acetamide, dimethylformamide, acetonitrile, propylnitrile, nitromethane, ethyl monoglyme, phosphate triesters, acetates, propionates, sulfolane, 3-methylsulfolane, 1,3-dimethyl-2-imidazolidinone, 3-methyl-2-oxazolidinone, propylene carbonate derivatives, ethyl ethers, diethyl ethers, 1,3-propanesultone, anisole, and flouorobenzene. These organic solvents can be used singly or, if necessary, in combination of two or more of them.

Examples of additives include vinylene carbonate, cyclohexyl benzene, biphenyl, diphenyl ether, vinyl ethylene carbonate, divinyl ethylene carbonate, phenyl ethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, and m-terphenyl. These additives can be used singly or, if necessary, in combination of two or more of them.

The non-aqueous electrolyte may be used as a solid electrolyte by mixing the above-mentioned solute with a high molecular material or a mixture of two of more high molecular materials such as polyethylene oxide, polypropylene oxide, polyphosphazene, polyaziridine, polyethylene sulfide, polyvinyl alcohol, polyvinylidene fluoride, and polyhexafluoropropylene. Also, the solid electrolyte may be mixed with the above-mentioned organic solvent to form a gel. Further, inorganic materials such as lithium nitrides, lithium halides, lithium oxyacid salts, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, phosphorus sulfide compounds may also be used as solid electrolytes. In the case of using a solid electrolyte or gelled electrolyte, it may be disposed between the negative electrode 15 and the positive electrode 16 instead of the separator 17. Alternatively, the gelled electrolyte may be disposed so as to be adjacent to the separator 17.

Figure 9:
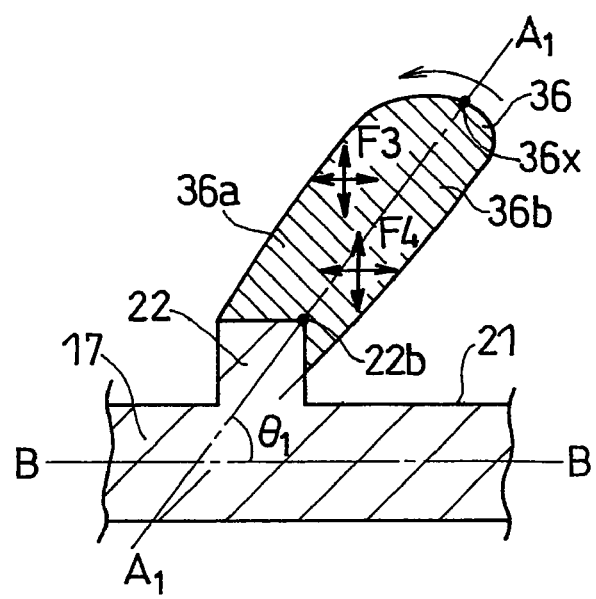
FIG. 9 are schematic longitudinal sectional views of the structure of negative electrodes in other modes of the present invention.
Figure 9:
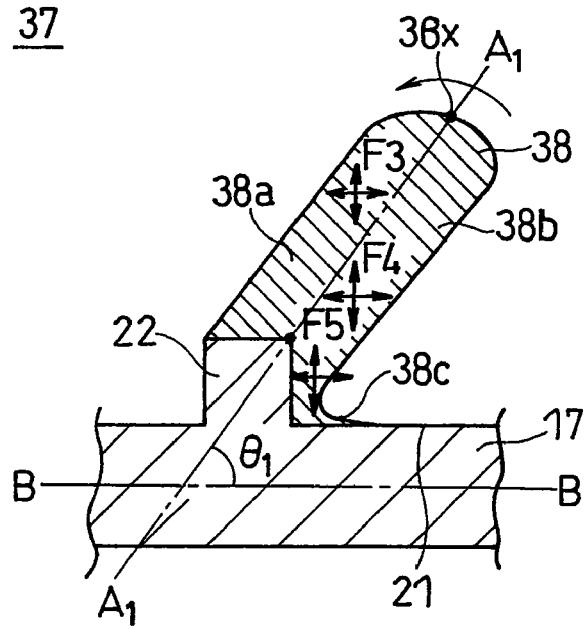

FIG. 9 are schematic longitudinal sectional views of the structures of a negative electrode 35 and a negative electrode 37 in other modes of the present invention. FIG. 9(a) illustrates a state of the negative electrode 35 before charge, and FIG. 9(b) illustrates a state of the negative electrode 37 before charge. The negative electrode 35 and the negative electrode 37 are similar to the negative electrode 15 illustrated in, for example, FIG. 2, and corresponding components are given the same reference characters and their descriptions are omitted.

The negative electrode 35 is characterized by having a column 36. The column 36 does not contain the thin film part 23a unlike the column 23 and is characterized by having an upper columnar part 36a and a lower columnar part 36b. Each of the upper columnar part 36a and the lower columnar part 36b contains a negative electrode active material. The upper columnar part 36a is a part of the column 36 located on the obtuse angle $(180-\theta_1)$ side in the cross-section of the negative electrode 35 before charge in the thickness direction thereof as illustrated in FIG. 9(a), the obtuse angle being formed between the center line $A_1$-$A_1$ of the column 36 in the grow direction thereof and the center line B-B of the negative electrode current collector 17. Also, the lower columnar part 36b is a part of the column 36 located on the acute angle $(\theta_1)$ side in the cross-section of the negative electrode 35 before charge in the thickness direction thereof as illustrated in FIG. 9(a), the acute angle being formed between the center line $A_1$-$A_1$ of the column 36 in the grow direction thereof and the center line B-B of the negative electrode current collector 17.

The column 36 is so structured that its expansion and contraction due to the absorption and release of lithium are greater in the lower column 36b than in the upper column 36a. More specifically, the content of an element in the negative electrode active material is continuously changed from the lower columnar part 36b toward the upper columnar part 36a. For example, when the negative electrode active material is a silicon oxide represented by SiOx, the content of oxygen is continuously decreased from the lower columnar part 36b toward the upper columnar part 36a in the range of $0 \leq x < 2$.

When the column 36 absorbs lithium ions during charging, expansion stress F3 occurs in the upper columnar part 36a, while expansion stress F4 occurs in the lower columnar part 36b. The expansion stress F4 of the lower columnar part 36b continuously decreases toward the upper columnar part 36a to become expansion stress F3. As a result, in the same manner as the column 23 of FIG. 5, the inclination angle θ formed between the center line $A_1$-$A_1$ of the column 36 and the center line B-B of the negative electrode current collector 17 changes from $\theta_1$ to $\theta_2$, and the column 36 stands up due to the moment shown by the arrow.

In the negative electrode 35, the expansion stress reversibly changing the inclination angle of the column 36 is created by continuously changing the expansion rate of the negative electrode active material contained in the column 36. Thus, a part corresponding to the thin film part 23a of the column 23 is not particularly necessary.

However, a thin film part 38c extending onto the depression 21 of the negative electrode current collector 17 may also be provided as in a column 38 of the negative electrode 37 illustrated in FIG. 9(b). In this case, since expansion stress F5 is further added to the expansion stress F4, the reversible change of the inclination angle can be further enlarged. As a result, it is possible to further enhance the effect of, for example, preventing the deposition of lithium metal on the surface of the current collector 17 during charging. The negative electrode 37 has the same structure as the negative electrode 35 except that the thin film part 38c is formed.

Figure 10:
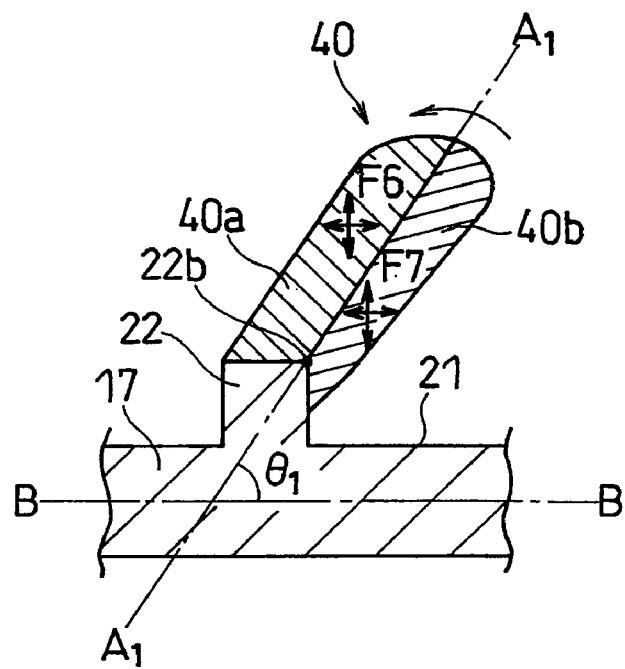
FIG. 10 are schematic longitudinal sectional views of the structure of negative electrodes in other modes of the present invention.
Figure 10:
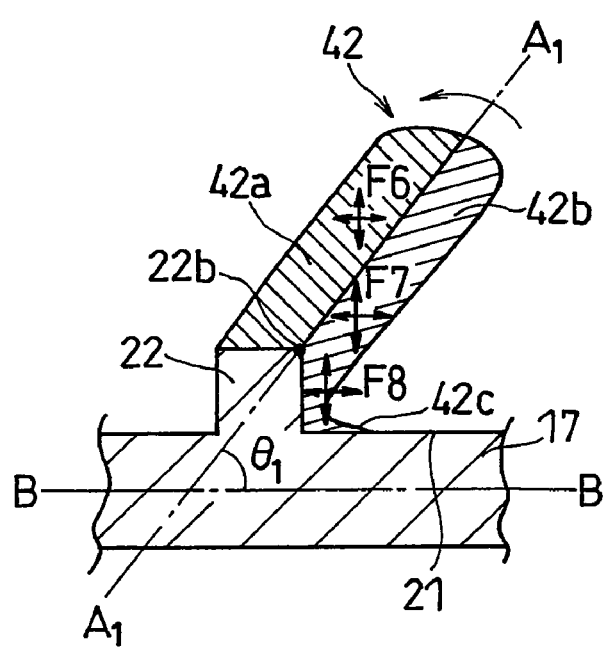

FIG. 10 are schematic longitudinal sectional views of the structures of a negative electrode 39 and a negative electrode 41 in other modes of the present invention. FIG. 10(a) illustrates a state of the negative electrode 39 before charge, and FIG. 10(b) illustrates a state of the negative electrode 41 before charge. The negative electrode 39 and the negative electrode 41 are similar to the negative electrode 35 and the negative electrode 37 illustrated in FIG. 9, and corresponding components are given the same reference characters and their descriptions are omitted.

The negative electrode 39 is characterized by including a column 40. The column 40 is similar to the column 36 of the negative electrode 35, and includes an upper columnar part 40a and a lower columnar part 40b, each of which contains a negative electrode active material. The upper columnar part 40a is a part of the column 40 located on the obtuse angle $(180-\theta_1)$ side in the cross-section of the negative electrode 39 before charge in the thickness direction thereof as illustrated in FIG. 10(a), the obtuse angle being formed between the center line $A_1$-$A_1$ of the column 40 in the grow direction thereof and the center line B-B of the negative electrode current collector 17. Also, the lower columnar part 40b is a part of the column 40 located on the acute angle $(\theta_1)$ side in the cross-section of the negative electrode 39 before charge in the thickness direction thereof as illustrated in FIG. 10(a), the acute angle being formed between the center line $A_1$-$A_1$ of the column 40 in the grow direction thereof and the center line B-B of the negative electrode current collector 17.

In the column 40, the negative electrode active material contained in the upper columnar part 40a is different from the negative electrode active material contained in the lower columnar part 40b, so that the expansion and contraction of the lower columnar part 40b are greater than the expansion and contraction of the upper column 40a. Specifically, the upper columnar part 40b is formed of a negative electrode active material whose expansion rate due to the absorption of lithium ions is smaller than the expansion rate of the negative electrode active material contained in the lower columnar part 40a.

For example, when the column 40 is formed of silicon and a silicon oxide represented by the composition formula SiOx, silicon is used for the lower columnar part 40b, and a silicon oxide represented by the above-mentioned composition formula where $0 < x < 2$ is used for the upper columnar part 40a. Alternatively, a silicon oxide represented by the above-mentioned composition formula where $0 < x < 2$ may be used for the lower column 40b, and a silicon oxide where the value x is lower than that of the silicon oxide used for the lower column 40b may be used for the upper columnar part 40a.

When the column 40 absorbs lithium ions during charging, expansion stress F6 occurs in the upper columnar part 40b, while expansion stress F7 occurs in the lower columnar part 36b. Since the amount of volume expansion of the upper columnar pat 40a is smaller than the amount of volume expansion of the lower columnar part 40b, the expansion stress F6 becomes smaller than the expansion stress F7. As a result, in the same manner as the column 23 of FIG. 5, the inclination angle θ formed between the center line $A_1$-$A_1$ of the column 40 and the center line B-B of the negative electrode current collector 17 changes from $\theta_1$ to $\theta_2$, and the column 40 stands up due to the moment shown by the arrow.

In the negative electrode 39, the expansion stress reversibly changing the inclination angle of the column 40 is created by the difference in the expansion rate between the negative electrode active materials contained in the column 40. Thus, a part corresponding to the thin film part 23a of the column 23 is not particularly necessary.

However, a thin film part 42c extending onto the depression 21 of the negative electrode current collector 17 may also be provided as in a column 42 of the negative electrode 41 illustrated in FIG. 10(b). In this case, since expansion stress F8 is further added to the expansion stress F7, the reversible change of the inclination angle can be further enlarged. As a result, it is possible to further enhance the effect of, for example, preventing the deposition of lithium metal on the surface of the current collector 17 during charging. The negative electrode 41 has the same structure as the negative electrode 39 except that the thin film part 42c is formed.

Figure 11:
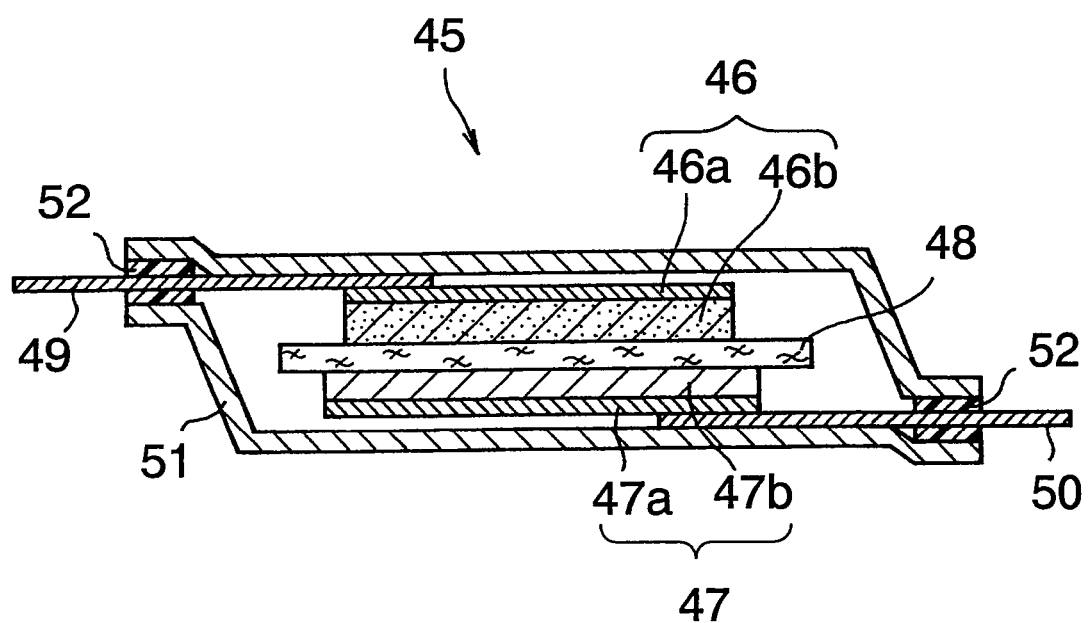
FIG. 11 is a schematic longitudinal sectional view of the structure of a layered-type non-aqueous electrolyte secondary battery in one embodiment of the present invention.

FIG. 11 is a schematic longitudinal sectional view of the structure of a layered-type non-aqueous electrolyte secondary battery 45 in one embodiment of the present invention.

In the layered-type non-aqueous electrolyte secondary battery 45, a positive electrode 46, a negative electrode 47, a separator 48, a non-aqueous electrolyte, and the other components may have the same structure as those of the non-aqueous electrolyte secondary battery 1 illustrated in FIG. 1. The difference between the layered-type non-aqueous electrolyte secondary battery 45 and the non-aqueous electrolyte secondary battery 1 lies only in whether the electrode group is of the wound type or layered-type.

The layered-type lithium secondary battery 45 has an electrode group including the positive electrode 46, the negative electrode 47, and the separator 48 interposed therebetween. The electrode group and a lithium-ion conductive non-aqueous electrolyte are housed in a housing 51. The lithium-ion conductive electrolyte is mainly impregnated into the separator 48. The positive electrode 46 includes a positive electrode current collector 46a and a positive electrode active material layer 46b carried on the positive electrode current collector 46a, while the negative electrode 47 includes a negative electrode current collector 47a and a negative electrode active material layer 47b carried on the negative electrode current collector 47a. One end of a positive electrode lead 49 and one end of a negative electrode lead 50 are connected to the positive electrode current collector 46a and the negative electrode current collector 47a, respectively. The other end of the positive electrode lead 49 and the other end of the negative electrode lead 50 are drawn out of the housing 51. The openings of the housing 51 are sealed with gaskets 52 made of a resin material.

The positive electrode active material layer 46b releases lithium ions during charging, and absorbs the lithium ions released by the negative electrode active material layer 47b during discharging. The negative electrode active material layer 47b absorbs the lithium ions released by the positive electrode active material during charging, and releases the lithium ions during discharging.

The layered-type lithium secondary battery 45 may have a laminate of three or more layers of the positive electrode 46 and the negative electrode 47, although not shown. However, positive electrodes having the positive electrode active material layer 46a on one side or both sides and negative electrodes having the negative electrode active material layer 47a on one side or both sides are used so that all the positive electrode active material layers 46a are opposed to the negative electrode active material layers 47a, and that all the negative electrode active material layers 47a are opposed to the positive electrode active material layers 46a.

Also, the separator 48 and the housing 51 can be commonly used in the field of lithium batteries like the non-aqueous electrolyte secondary battery 1 without any particular limitation.

In FIG. 11, one example of layered-type non-aqueous electrolyte secondary batteries is illustrated, but the present invention is also applicable to cylindrical non-aqueous electrolyte secondary batteries or prismatic electrolyte secondary batteries having a wound-type electrode group. The shape of the non-aqueous electrolyte secondary battery is not particularly limited and, for example, coin, button, sheet, cylindrical, flat, and rectangular shapes can be used.

Next, the method for producing the negative electrode of the present invention is described. The production method of the negative electrode of the present invention includes the steps of: (i) working a current collector, (ii) forming a pattern, (iii) forming a thin film, (iv) removing the pattern, and (v) forming columns.

In the current-collector-working step (1), depressions and protrusions are formed on the surface of one face or both faces of a current collector in the thickness direction thereof.

In the pattern-forming step (ii), a resist pattern made of a resist resin is formed on the depressions.

In the thin-film-forming step (iii), a negative electrode active material is deposited on the surface of the current collector having the depressions and protrusions from the direction perpendicular to said surface, to form a thin film containing the negative electrode active material on said surface.

In the pattern-removing step (iv), the resist pattern on the depressions is removed, to provide the depressions with exposed regions where the thin film is not carried.

In the column-forming steps (v), the negative electrode active material is oblique deposited on the surface of the current collector having the depressions and protrusions. As a result, columns are carried on the surfaces of the protrusions, or the surfaces of the protrusions and the surface of the thin film in such a manner that each of the columns is grown outwardly from the surface of the protrusion, or the surface of the protrusion and a part of the surface of the thin film, being inclined at an angle relative to the direction perpendicular to the surface of the current collector.

The production method of the present invention can be carried out, for example, by using, a lift-off process utilizing a negative-type, UV-sensitive liquid resist resin.

Figure 12:
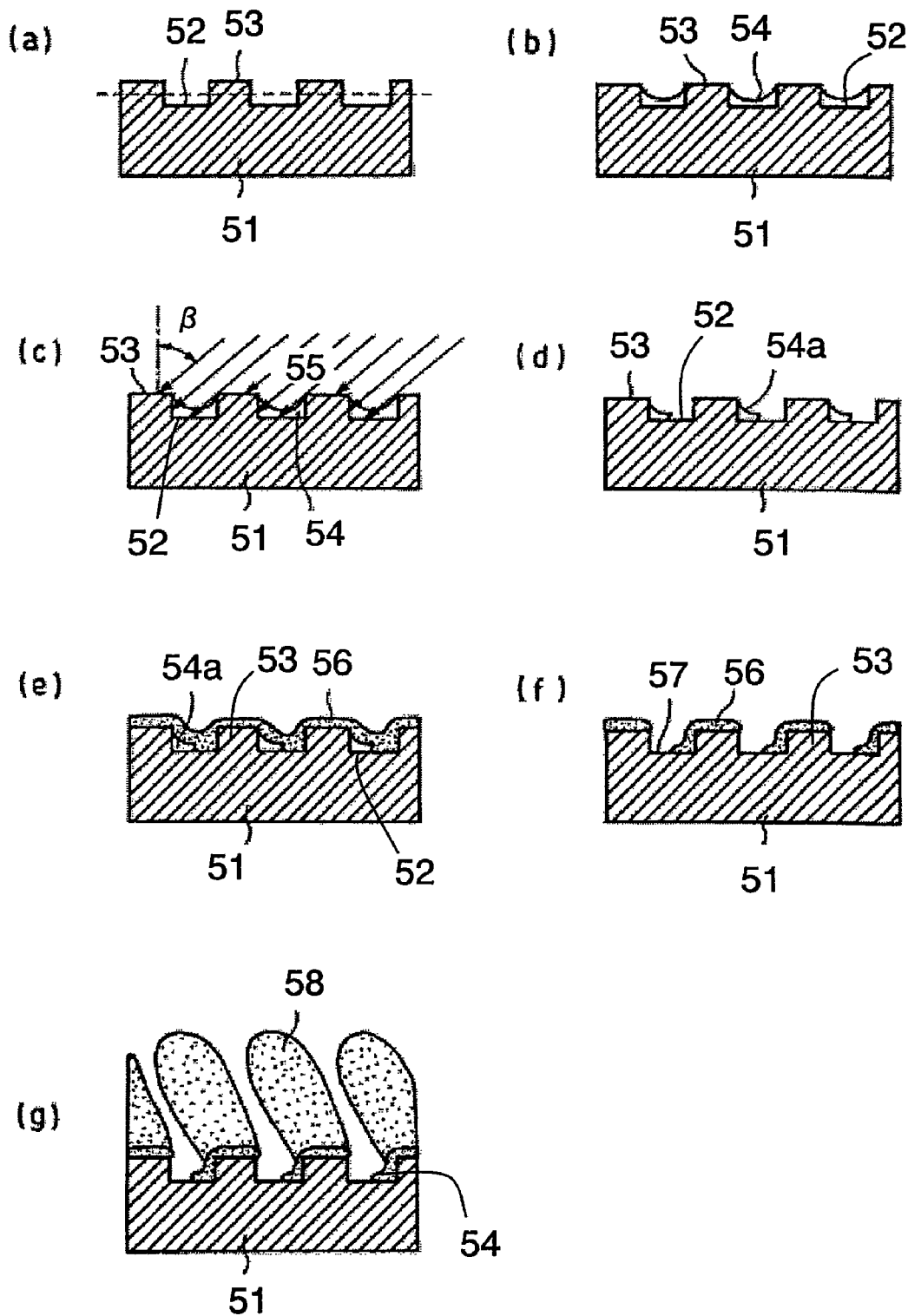
FIG. 12 is a flow chart of steps for producing a negative electrode in one embodiment of the present invention.

FIG. 12 is a flow chart of steps for producing a negative electrode in one embodiment of the present invention.

In the step illustrated in FIG. 12(a), a negative electrode current collector 51 having depressions 52 and protrusions 53 on the surface in the thickness direction thereof is prepared. That is, the step of FIG. 12(a) is the current-collector-working step (i).

The negative electrode current collector 51 can be obtained, for example, by forming a pattern of protrusions and depressions on the surface of a metal foil. The method for forming a pattern of protrusions and depressions on the surface of a metal foil is not particularly limited, and examples of such methods include etching using a resist resin or the like, electrodeposition, and plating. Also, a die or a ceramic die having a pattern of protrusions and depressions may be pressed against a metal foil to transfer the pattern of protrusions and depressions onto the metal foil.

In the step illustrated in FIG. 12(b), a liquid resist resin is applied onto the depressions 52 and temporarily cured to form temporarily cured layers 54 of the resist resin. The liquid resist resin can be any known resist resin, and such examples include a negative-type liquid resist resin. A negative-type liquid resist resin is available, for example, from Tokyo Ohka Kogyo Co., Ltd.

In the step illustrated in FIG. 12(c), ultraviolet light 55 is projected onto the temporarily cured layers 54 at a predetermined incident angle β to partially cure the temporarily cured layers 54. The ultraviolet light does not reach the areas of the temporarily cured layers 54 shielded by the protrusions 53. It is therefore possible to control the curing areas of the temporarily cured layers 54 covering the depressions 52 by controlling the incident angle β. Projection of ultraviolet light can be done by using a device prepared by modifying a common collimated light exposure device.

In the step illustrated in FIG. 12(d), the partially cured temporarily cured layers 54 are brought into contact with a liquid developer to remove the resist resin of the uncured portions. In the case of using a negative-type liquid resist resin of Tokyo Ohka Kogyo Co., Ltd., for example, an aqueous solution of $NaHCO_3$ can be used as the liquid developer. At this time, the resist resin of the temporarily cured portions that were not exposed to the ultraviolet light in the step (c) is removed, and the resist resin cured layers 54a that were cured due to the exposure to the ultraviolet light remains on the depressions. In this way, a resist pattern is formed. That is, the steps of FIGS. 12(b) to (d) correspond to the pattern-forming step (ii).

In the step illustrated in FIG. 12(e), a negative electrode active material source is deposited on the surface of the negative electrode current collector 51 having the depressions 52, protrusions 53 and cured layers 54a from the direction perpendicular to said surface, so that a thin film part 56 containing the negative electrode active material is carried on said surface. By controlling the deposition time, the thickness of the thin film part 56 carried on the depressions 53 can be controlled. The thickness of the thin film part 56 is preferably 0.5 μm to 5 μm, and more preferably 1 μm to 3 μm. The thin film part 56 is formed on the surfaces of the depressions 52 having no cured layer 54a, the surfaces of the protrusions 53, and the surfaces of the cured layers 54a. The step illustrated in FIG. 12(e) is the thin-film-forming step (iii).

In the step illustrated in FIG. 12(f), the cured layers 54a are removed by using a liquid stripper, to provide each of the depressions 52 with an exposed region 57 where no thin film part 56 is carried. The liquid stripper can be, for example, an aqueous solution of sodium hydroxide. At this time, together with the cured layers 54a, the thin film part 56 carried on the surface thereof is also removed. The step illustrated in FIG. 12(f) is the pattern-removing step (iv).

In the step illustrated in FIG. 12(g), the negative electrode active material source is deposited on the surface of the negative electrode current collector 51 with the thin film parts 56 at a predetermined incident angle, so that a columnar part 58 containing the negative electrode active material is carried on each of the protrusions 53. The incident angle as used herein is the angle formed between the direction perpendicular to the surface of the negative electrode current collector 51 and the incident direction of the negative electrode active material source. The step illustrated in FIG. 12(g) is the column-forming step (v).

When the negative electrode active material source is projected onto the surface of the negative electrode current collector 51 at a predetermined incident angle (the angle at which the depressions 52 are shadowed and shielded by the protrusions 53) that is not 0°, the negative electrode active material is more likely to deposit on the protrusions 53, and the deposition of the negative electrode active material on the depressions 52 is impeded. Thus, the negative electrode active material is grown outwardly mainly from the surfaces of the protrusions 53 of the negative electrode current collector 51. The height of the columnar parts 58 (or the thickness of the negative electrode active material layer) can be controlled by the deposition time. Also, gaps are formed among the adjacent columnar parts 58. This can produce a negative electrode in which, for example, the thin film part 56 with a thickness of 1 μm is carried on a part of each of the depressions 52 and the columnar part 58 with a height of 20 μm is carried on each of the protrusions 53.

The incident angle is represented by φ, the effective height of the protrusions 53 provided on the surface of the negative electrode current collector 51 having the thin film parts 56 is represented by H, and the effective width of the depressions 53 provided on the surface of the negative electrode current collector 51 having the thin film parts 56 is represented by L. In this case, when $2H/L \geq \tan(90-\varphi)$, as illustrated in FIG. 4, the columnar part 58 is grown only on each of the protrusions 53. On the other hand, when $2H/L < \tan(90-\varphi)$, as illustrated in FIG. 2, the columnar part 58 is grown so as to extend from the surface of the protrusion 53 to the surface of the thin film part 56. In the step illustrated in FIG. 12(b), the incident angle β of the ultraviolet light preferably satisfies $2H/L < \tan(90-\beta)$.

As used herein, the "effective height" of the protrusion refers to the distance from the average line of the surface of the negative electrode current collector 51 having the thin film part 56 to the point at which a straight line parallel to the incident direction contacts the protrusion 53 as the tangent. For example, when the protrusion 53 is rectangular as illustrated in FIG. 2 and when the center of the protrusion 53 is recessed, the "effective height" of the protrusion 53 is synonymous with the "height" thereof. Also, the "effective width" of the protrusion 53 refers to the width between the points at which straight lines parallel to the incident direction contact the protrusion 53 as the tangents on a plane parallel to the surface of the negative electrode current collector 51 having the thin film part 56. For example, when the protrusion is rectangular as illustrated in FIG. 2 and when the center of the protrusion is recessed, the "effective width" of the protrusion is synonymous with the "width" thereof.

Figure 13:
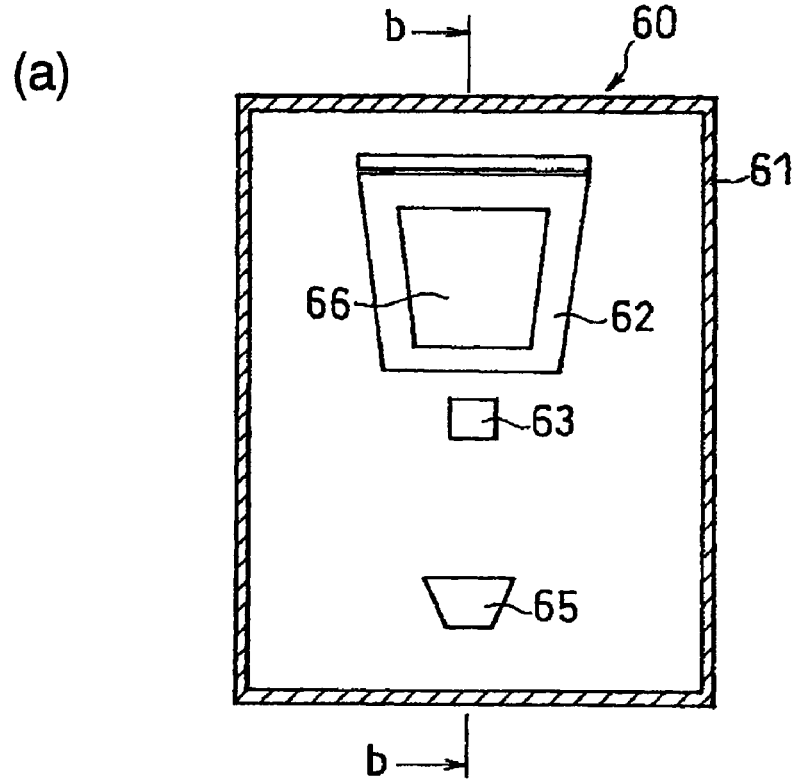
FIG. 13 are schematic drawings of the structure of a deposition device.
Figure 13:
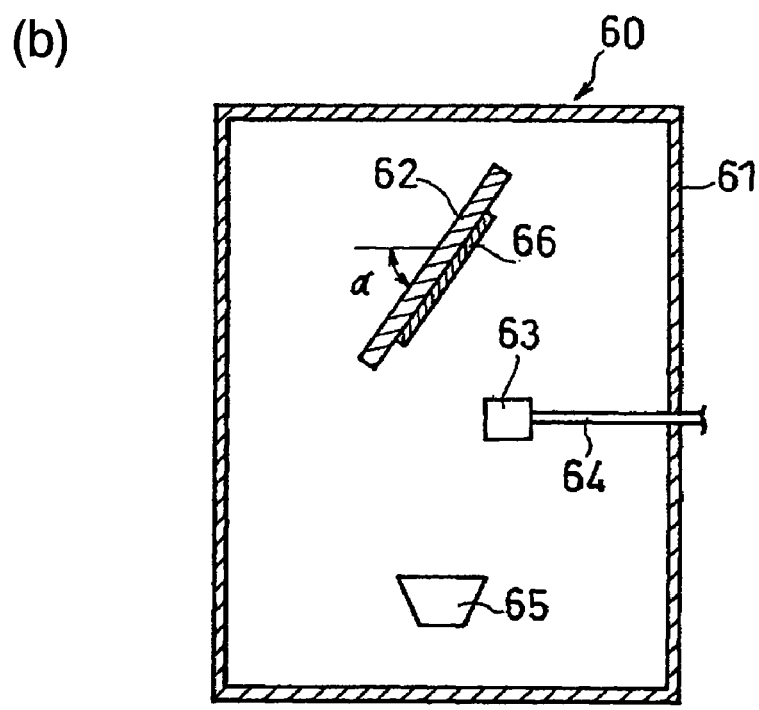

When the negative electrode active material source is deposited on the surface of the negative electrode current collector 51 having the thin film parts 56, for example, a deposition device 60 illustrated in FIG. 13 can be used. FIG. 13(a) is a schematic side view of the structure of the deposition device 60; however, a chamber 61 is shown in section. FIG. 13(b) is a sectional view taken along line b-b of FIG. 13(a), and the chamber 61 is also shown in section.

The deposition device 60 includes a chamber 61 for providing a vacuum atmosphere, a fixing bench 62 for fixing a current collector 66, a nozzle 63 for releasing a gas into the chamber 61, a gas pipe 64 for introducing the gas into the chamber 61 from the outside, a deposition source 65 including an active material source, and an electron beam device (not shown) for heating the deposition source 65.

The fixing bench 62 for fixing the current collector 66 is placed above the nozzle 63. Placed vertically below the fixing bench 62 is the deposition source 65. For example, when a silicon oxide is deposited as the active material on the surface of the current collector 66, silicon simple substance is used as the active material source in the deposition source 65. Through the nozzle 63, a high purity oxygen gas is released. When an electron beam is projected onto the deposition source 65, the silicon simple substance is heated to become vapor. The silicon vapor passes through the oxygen atmosphere and deposits on the surface of the current collector 66 as a silicon oxide.

In the deposition device 60, the positional relation between the current collector 66 and the deposition source 65 can be changed by rotating the fixing bench 62 placed vertically above the deposition source 65. Forming the thin film part, the angle α between the fixing bench 62 and a horizontal plane is set to 0°. Also, forming the columnar parts 23*b*, the angle α is set to 0°<α<90° (e.g., 60°). In this case, the active material source is projected onto the surface at a predetermined incident angle greater than 0°. Hence, the active material does not deposit on the depressions shielded by the protrusions, and the active material deposits on the protrusions in columnar form. As a result, the grown columnar parts 58 are inclined relative to the direction perpendicular to the surface of the current collector 66.

Also, in the present invention, a negative electrode can be produced by another production method. This production method includes the steps of (i) working a current collector, (ii) forming a thin film, and (iii) forming columns.

In the current-collector-working step (i), depressions and protrusions are formed on the surface of one face or both faces of a current collector in the thickness direction thereof.

In the thin-film-forming step (ii), the vapor of a negative electrode active material is projected onto the surface of the current collector having the depressions and protrusions for deposition in such a manner that the incident angle φ of the negative electrode active material vapor relative to the direction perpendicular to the surface of the current collector satisfies the formula $2H/L < \tan(90-\phi)$ where H represents the effective height of the protrusions and L represents the width of the depressions, so that a thin film containing the negative electrode active material is carried on the surface of each of the protrusions and a part of the surface of each of the depressions.

In the column-forming step (iii), the negative electrode active material vapor is projected onto the surface of the current collector having the depressions and protrusions for deposition in such a manner that the incident angle φ of the negative electrode active material vapor relative to the direction perpendicular to the surface of the current collector satisfies the formula $2H/L \geq \tan(90-\phi)$ where H and L represent the same as the above. As a result, columns containing the negative electrode active material are carried on the surfaces of the protrusions, or the surfaces of the protrusions and the surface of the thin film in such a manner that each of the columns is grown outwardly from the surface of the protrusion, or the surface of the protrusion and a part of the surface of the thin film, being inclined at an angle relative to the direction perpendicular to the surface of the current collector.

According to this production method, a negative electrode of the present invention can be easily produced merely by changing the incident angle of the negative electrode active material source relative to the surface of the negative electrode current collector without using a lift-off process.

Specifically, first, a negative electrode active material source is deposited on the surface of the current collector having the depressions and protrusions at a predetermined incident angle θ satisfying $2H/L < \tan(90-\phi)$. In this case, the negative electrode active material is more likely to deposit on the protrusions and a part of the depressions, and the deposition of the negative electrode active material on the remaining part of the depressions is impeded. This is because a part of the depressions are shielded by the adjacent protrusions. Thus, by making the deposition time short, a thin film part containing the negative electrode active material can be carried on a region extending from the protrusion to the depression. Next, the negative electrode active material source is deposited on the surface of the current collector at a predetermined incident angle θ satisfying $2H/L \geq \tan(90-\phi)$. In this case, only the deposition of the active material on the protrusions takes place, and the deposition of the active material on the depressions is impeded. As a result, the columnar parts are grown only on the protrusions. This can produce a negative electrode of the present invention.

Next, the present invention is specifically described by way of Examples.

Example 1

A layered-type lithium secondary battery as illustrated in FIG. 11 was produced in the following manner.

(i) Preparation of Positive Electrode

A positive electrode mixture paste was prepared by sufficiently mixing 10 g of lithium cobalt oxide ($LiCoO_2$) powder with a mean particle size of approximately 10 μm, serving as a positive electrode active material, 0.3 g of acetylene black, serving as a conductive agent, 0.8 g of polyvinylidene fluoride powder, serving as a binder, and a suitable amount of N-methyl-2-pyrrolidone (NMP).

The resultant paste was applied onto one face of a positive electrode current collector 75*a* made of a 20-μm thick aluminum foil, dried and rolled to form a positive electrode active material layer 75*b*. This was then cut into a predetermined shape to obtain a positive electrode. The positive electrode active material layer carried on one side of the aluminum foil of the positive electrode thus obtained had a thickness of 70 μm and a size of 30 mm×30 mm.

(ii) Preparation of Negative Electrode (a) Preparation of Negative Electrode Current Collector A current collector was prepared by producing a copper foil with a surface having a protrusion-depression pattern as illustrated in FIG. 12(*a*), and cutting it to a size of 40 mm×40 mm. All the protrusions had the same shape.

The orthographic views of the protrusions from the direction perpendicular to the surface of the current collector were square. One side of the square was 10 μm in length. A cross-section of the protrusion parallel to one side of the orthographic view of the protrusion in the thickness direction of the current collector (hereinafter section Y: the section parallel to the incident direction of the deposited active material source in the thickness direction of the current collector) had a rectangular shape. In the section Y, the height of the protrusion was 3 μm, and the difference in height between the protrusion and the depression was 6 μm. In the section Y, the width of the depression (i.e., the interval between the adjacent protrusions) was 100% of the width of the protrusion (i.e., 10 μm).

To prepare the protrusion-depression pattern of the current collector, a dry film resist available from Hitachi Chemical Company, Ltd. was laminated on the surface of a 14-μm thick rolled copper foil (available from Nippon Foil Mfg. Co., Ltd.). Using a photomask with a pattern of 10-μm square dots arranged at intervals of 10 μm, the dry film resist on the copper foil was exposed to light and then developed with a $NaHCO_3$ aqueous solution. This copper foil was electrolytically plated with copper. The copper foil was then immersed in a sodium hydroxide aqueous solution, so that the resist was completely removed. In this way, protrusions with a height of 3 μm were formed (the difference in height between the protrusions and the depressions was 6 μm).

The current collector thus obtained was fixed to the fixing bench 62 of the deposition device 60 (available from ULVAC, Inc.), as illustrated in FIG. 13. The gas pipe 64 was connected to an oxygen cylinder via a massflow controller. The nozzle 63 for releasing oxygen gas was installed vertically below the upper end of the fixing bench 62 and 3 cm below the height of the center of gravity of the fixing bench 62. Also, the deposition source 65 including an active material source was placed 7 cm vertically below the center of gravity of the fixing bench 62. The active material source used was a silicon simple substance with a purity of 99.9999% (available from Kojundo Chemical Lab. Co., Ltd).

The fixing bench 62 was slightly rotated in one direction to set the angle α formed between the fixing bench 62 and a horizontal plane to 10°, and the active material was deposited to form thin film parts. The deposition time was controlled so that the thickness of the thin film parts was 1 μm. The acceleration voltage of the electron beam was set to −8 kV, the emission to 250 mA, and the oxygen flow rate to 20 sccm. The angle α formed between the fixing bench 62 and a horizontal plane and the incident angle ϕ of the active material source satisfy the relation: $\tan \alpha = \tan \phi$. Thus, the angle ϕ is 10°, and the relation: $2H/L = 6/10 < \tan(90-\phi)$ holds.

Next, the fixing bench 62 was further rotated in the same direction to set the angle α between the fixing bench and a horizontal plane to 60°. Thus, the angle ϕ is 60° and the relation: $2H/L = 6/10 \geq \tan(90-\phi)$ holds. In this state, the active material was deposited to form columnar parts. The deposition time was controlled so that the thickness of the active material layer was 20 μm after the completion of the deposition.

In forming the columnar parts, the acceleration voltage of the electron beam projected to the deposition source 65 was set to −8 kV, and the emission was set to 250 mA. The oxygen flow rate was set to 20 sccm. The vapor of the silicon simple substance together with oxygen in the chamber 41 deposited on the protrusions of the surface of the current collector 66 as a silicon oxide. In this way, a negative electrode of the present invention was produced. This negative electrode was cut to a size of 31 mm×31 mm.

The amount of oxygen contained in the active material layer was quantified by a combustion method, and the result showed that the composition of the silicon oxide was $SiO_{0.3}$.

Figure 14:
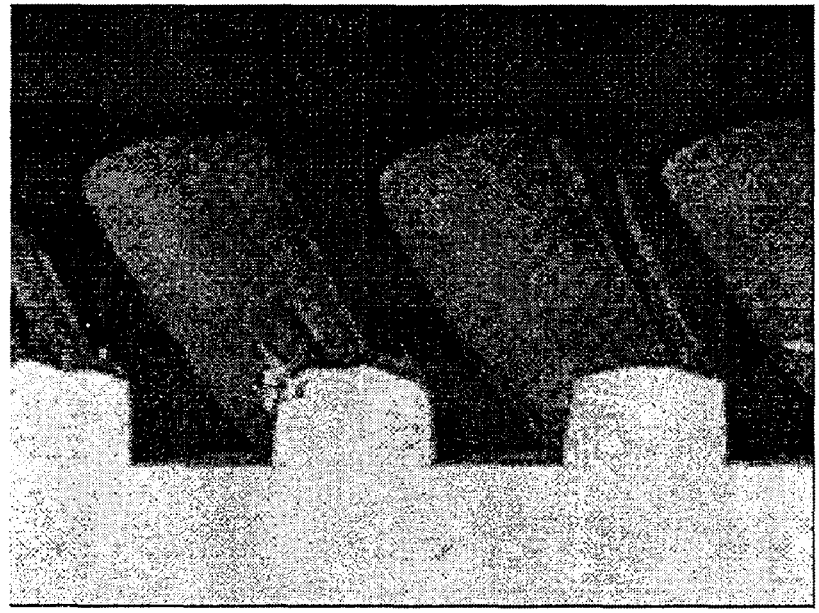
FIG. 14 is an electron micrograph of a cross-section of a negative electrode of the present invention in the thickness direction thereof.

Next, cross-sections of the negative electrode were observed with an electron microscope from various angles. FIG. 14 is an electron micrograph of a section of the negative electrode. An analysis of the electron micrograph confirmed that a thin film part with a thickness of approximately 1 μm was carried on a part of each depression of the current collector surface, and that no thin film part was carried on the remaining part of the depression. Also, the negative electrode active material was not carried on the part of the depression surface shadowed when the columnar part was deposited.

Also, a horizontal section of the negative electrode was observed with an electron microscope to analyze the orthographic view of the active material layer from the direction perpendicular to the current collector surface. As a result, the orthogonally projected area of the contact portions of the active material layer and the current collector from the direction perpendicular to the current collector surface was 95% of the orthogonally projected area of the current collector surface carrying the active material layer.

The other characteristics of the negative electrode active material layer are shown below.

The angle θ formed between the columnar parts and the direction of the normal to the current collector: 30°

The diameter of the columnar parts: 15 μm

The porosity P of the negative electrode active material layer: 52% (P': 45%)

The angle ϕ is 60° and the angle θ is 30°, and the relation: $\tan \phi = 2 \tan \theta$ does not hold. This is probably due to the influence of oxygen introduced from the nozzle 63.

(iii) Battery Production

A positive electrode lead 79 was connected to the backside of the positive electrode current collector having no positive electrode active material layer.

A negative electrode lead 80 was connected to the backside of the negative electrode current collector having no negative electrode active material layer.

The positive electrode active material layer was opposed to the negative electrode active material layer with a separator made of a 20-ϕm thick polyethylene micro-porous film of Asahi Kasei Corporation interposed therebetween, to form a thin electrode group. This electrode group and an electrolyte were inserted into a housing made of an aluminum laminate sheet. The electrolyte used was a non-aqueous electrolyte prepared by mixing ethylene carbonate (EC) and ethyl methyl carbonate (EMC) in a volume ratio of 1:1 and dissolving $LiPF_6$ therein at a concentration of 1.0 mol/L. The non-aqueous electrolyte was impregnated into the positive electrode active material layer, the negative electrode active material layer, and the separator. Thereafter, with the positive electrode lead and the negative electrode lead drawn out, while evacuating the housing, the ends thereof were welded to complete a test battery. The test battery is designated as a battery 1A.

Comparative Example 1

In the same manner as in Example 1, a negative electrode current collector having a protrusion-depression pattern on the surface was produced. The resulting current collector was fixed to the fixing bench 62 of the same deposition device 60, and the fixing bench 62 was rotated in one direction to set the angle α formed between the fixing bench and a horizontal plane to 30°. Thus, the incident angle ϕ of the active material source is 30°, and the relation: $2H/L = 6/10 \geq \tan(90-\phi)$ holds. In this state, the negative electrode active material was deposited to form a 20-μm thick negative electrode active material layer composed only of columnar parts. Except for the above, in the same manner as in Example 1, a negative electrode of Comparative Example 1 was produced.

The amount of oxygen contained in the negative electrode active material layer obtained was quantified by a combustion method, and the result showed that the composition of the silicon oxide was $SiO_{0.3}$. Next, cross-sections of the negative electrode were observed with an electron microscope from various angles. The result confirmed that each of the columnar parts deposited so as to extend from the protrusion to the depression, as illustrated in FIG. 3. Also, a horizontal section of the negative electrode was observed with an electron microscope to analyze the orthographic view of the negative electrode active material layer from the direction perpendicular to the current collector surface. As a result, the orthogonally projected area of the contact portions of the negative electrode active material layer and the current collector from the direction perpendicular to the current collector surface was 70% of the orthogonally projected area of the current collector surface carrying the negative electrode active material layer.

The other characteristics of the negative electrode active material layer are shown below.

The angle θ formed between the columnar parts and the direction perpendicular to the current collector surface: 15°

The diameter of the columnar parts: 18 μm

The porosity P of the negative electrode active material layer: 35% (P': 25%)

The angle $\phi$ is 60° and the angle $\theta$ is 30°, and the relation: tan $\phi$=2 tan $\theta$ does not hold. This is probably due to the influence of oxygen introduced from the nozzle 63.

The negative electrode thus obtained had a cross-section as illustrated in FIG. 3. A battery of Comparative Example 1 was produced in the same manner as in Example 1 except for the use of this negative electrode instead of the negative electrode of Example 1.

Comparative Example 2

In the same manner as in Example 1, a negative electrode current collector having a protrusion-depression pattern on the surface was produced. The resulting current collector was fixed to the fixing bench 62 of the same deposition device 60, and the fixing bench 62 was rotated in one direction to set the angle $\alpha$ formed between the fixing bench and a horizontal plane to 60°. Thus, the incident angle $\phi$ of the active material source is 60°, and the relation: 2H/L=6/10$\geq$tan(90−$\phi$) holds. In this state, the negative electrode active material was deposited to form a 20-μm thick negative electrode active material layer composed only of columnar parts. Except for the above, in the same manner as in Example 1, a negative electrode of Comparative Example 2 was produced.

The amount of oxygen contained in the negative electrode active material layer obtained was quantified by a combustion method, and the result showed that the composition of the silicon oxide was $SiO_{0.3}$.

Figure 15:
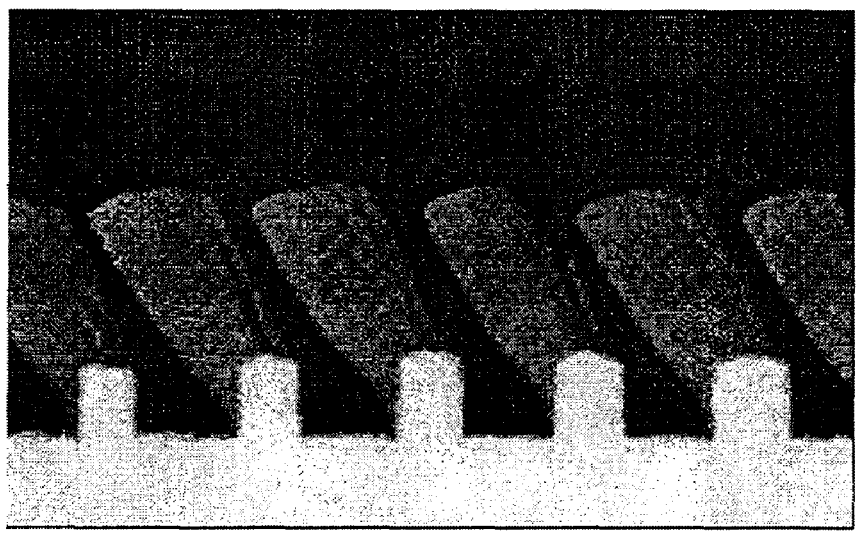
FIG. 15 is an electron micrograph of a cross-section of a negative electrode of a comparative example in the thickness direction thereof.

Next, cross-sections of the negative electrode were observed with an electron microscope from various angles. The negative electrode had a cross-section as illustrated in FIG. 4. FIG. 15 shows an electron micrograph of a cross-section of the negative electrode. An analysis of the electron micrograph confirmed that the columnar parts deposited only on the protrusions, as illustrated in FIG. 4. Also, a horizontal section of the negative electrode was observed with an electron microscope to analyze the orthographic view of the negative electrode active material layer from the direction perpendicular to the current collector surface. As a result, the orthogonally projected area of the contact portions of the negative electrode active material layer and the current collector from the direction perpendicular to the current collector surface was 50% of the orthogonally projected area of the current collector surface carrying the negative electrode active material layer.

The other characteristics of the negative electrode active material layer are shown below.

The angle $\theta$ formed between the columnar parts and the direction perpendicular to the current collector surface: 30°

The diameter of the columnar parts: 15 μm

The porosity P of the negative electrode active material layer: 51% (P': 46%)

The angle $\phi$ is 60° and the angle $\theta$ is 30°, and the relation: tan $\phi$=2 tan $\theta$ does not hold. This is probably due to the influence of oxygen introduced from the nozzle 63.

A battery of Comparative Example 2 was produced in the same manner as in Example 1 except for the use of this negative electrode instead of the negative electrode of Example 1.

[Evaluation]

The batteries of Example 1 and Comparative Examples 1 and 2 were placed in a 20° C. thermostatic chamber and charged by a constant-current constant-voltage method. Specifically, the batteries were charged at a constant current of 1 C rate (1C is the current value at which the whole battery capacity can be used up in 1 hour) until the battery voltage reached 4.2 V. After 4.2 V was reached, they were charged at the constant voltage until the current value reached 0.05 C. After the charge, they were allowed to stand for 30 minutes and then discharged at a constant current of 1 C rate until the battery voltage reached 2.5 V. Thereafter, they were again discharged at a constant current of 0.2 C until the battery voltage reached 2.5 V. After the redischarge, they were allowed to stand for 30 minutes.

(Peeling Test)

The batteries of Example 1 and Comparative Examples 1 and 2 were subjected to a peeling test utilizing adhesive tape as defined in JIS-2-1522. The results are shown in Table 1.

(Appearance of Negative Electrode)

After 1 cycle of the above-described charge/discharge, the respective batteries were disassembled to check their negative electrodes for wrinkles. The results are shown in Table 1.

(Capacity Retention Rate)

After 10 cycles of the above-described charge/discharge, the ratio of the whole discharge capacity at the $10^{th}$ cycle relative to the whole discharge capacity at the initial cycle was obtained as the capacity retention rate. The results are shown in Table 1.

TABLE 1

| Battery | Peeling test | Negative electrode appearance/ Wrinkled | Capacity retention rate (%) |
| --- | --- | --- | --- |
| Example 1 | Not separated | No | 95 |
| Comparative Example 1 | Not separated | Yes | 90 |
| Comparative Example 2 | Separated | No | Unable to cycle |

As shown in Table 1, the batteries of Example 1 and Comparative Example 1 did not exhibit a significant decline in the peeling strength of the negative electrode active material layer from the current collector. On the other hand, the battery of Comparative Example 2 exhibited a significant drop in the peel strength. Also, the capacity retention rate of the battery of Example 1 improved relative to the batteries of Comparative Examples 1 and 2.

Further, while the negative electrodes of Example 1 and Comparative Example 2 did not become wrinkled, the negative electrode of Comparative Example 1 became wrinkled. In the negative electrode of Comparative Example 1, as illustrated in FIG. 3, since part of each of the columnar particles 26 is carried on the depression 21, the columnar particles 26 have a large width. Thus, the gap between the columnar particles 26 is small, and it is not possible to form sufficient gaps in the negative electrode active material layer. Probably for this reason, the expansion stress of the negative electrode active material cannot be sufficiently eased, thereby resulting in wrinkles.

In the negative electrode of Comparative Example 2, as shown in the figure, since the columnar particles 28 are grown only from the protrusions 22, the contact areas of the current collector 17 and the columnar particles 28 are small, so that the bonding strength lowers. As a result, the negative electrode does not become wrinkled or broken due to the expansion stress of the negative electrode active material during charging/discharging. However, as charge/discharge is repeated, the columnar particles 28 become separated from the current collector 17 due to the influence of expansion stress, so that charge/discharge characteristics lower.

Example 2

Figure 16:
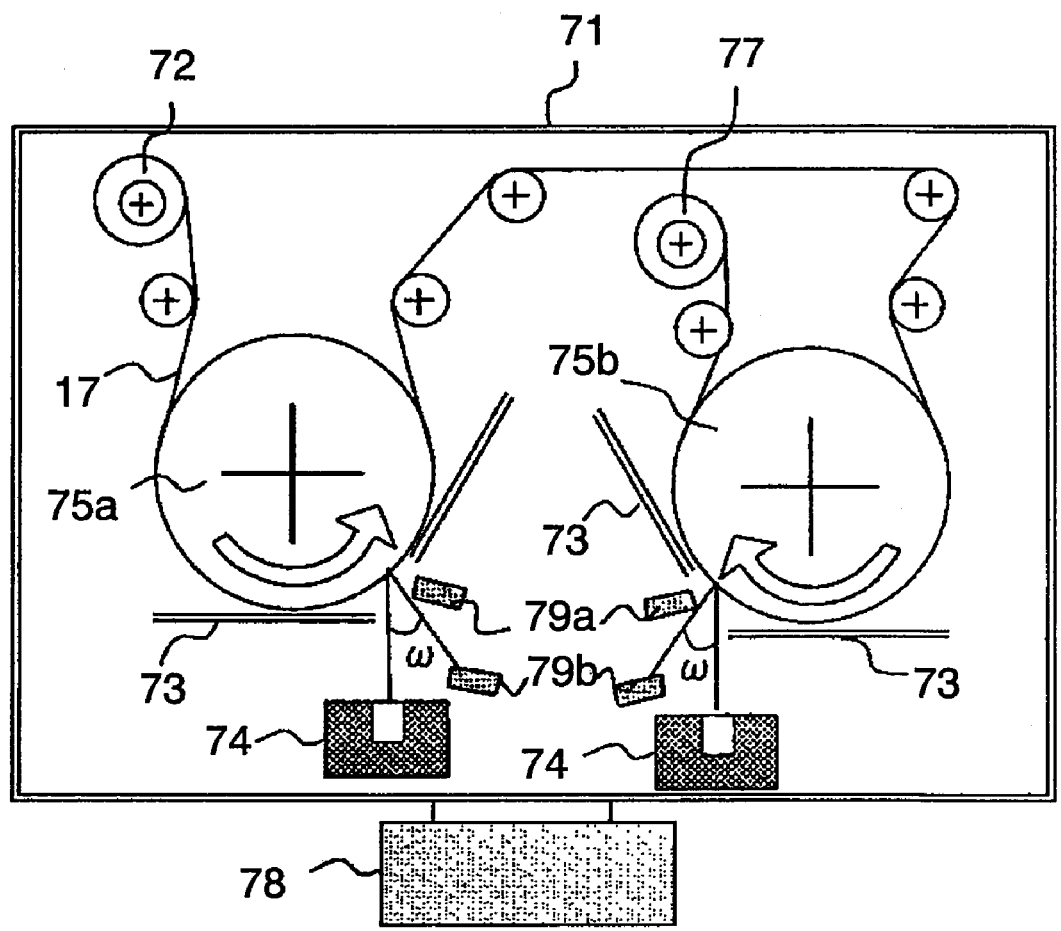
FIG. 16 is a schematic sectional view of the structure of a device for producing columns that grow inclined relative to the direction perpendicular to the surface of a current collector.
Figure 17:
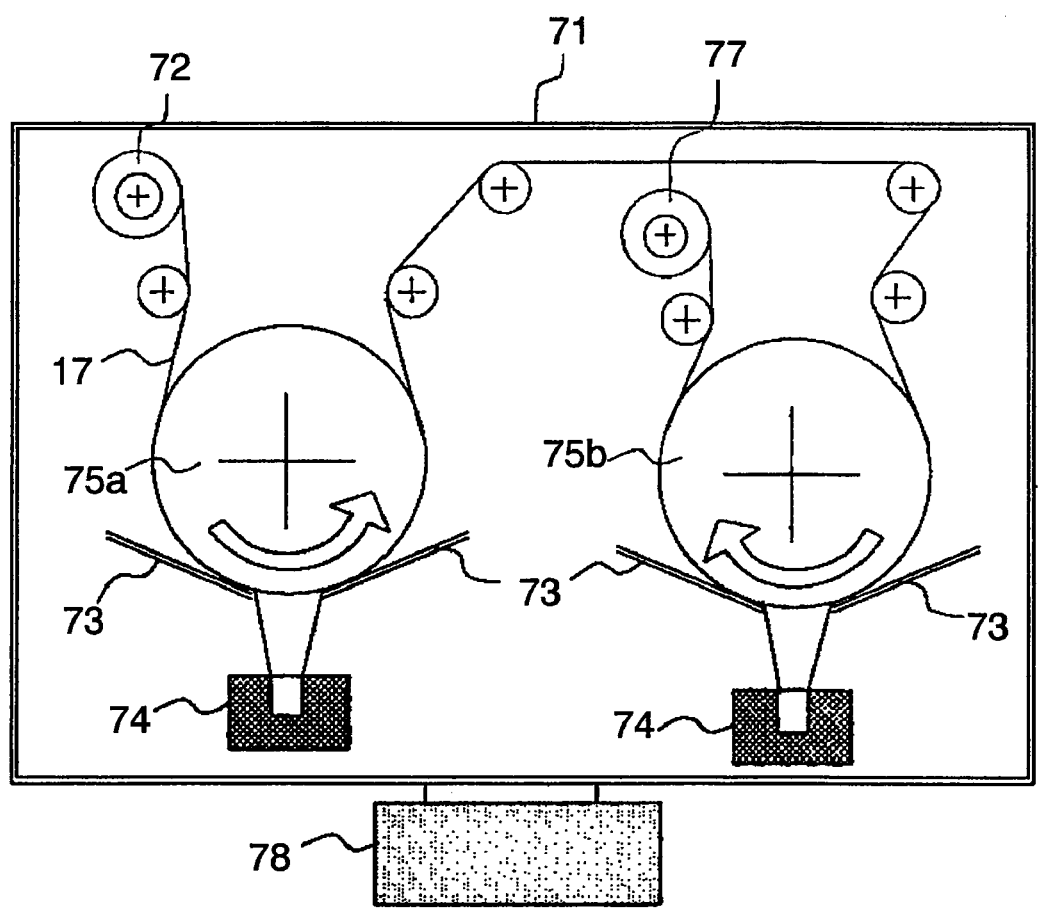
FIG. 17 is a schematic sectional view of the structure of a device for producing columns that grow in the direction perpendicular to the surface of a current collector.

With reference to FIG. 16, a device for producing columns of a negative electrode is briefly described. FIG. 16 is a schematic sectional view of the structure of a device for producing columns that grow inclined relative to the direction perpendicular to the surface of a current collector. FIG. 17 is a schematic sectional view of the structure of a device for producing columns that grow in the direction perpendicular to the surface of a current collector.

As illustrated in FIG. 16, a production device 70 has a vacuum vessel 71, which contains an unwinding roll 72, masks 73, deposition sources 74, film-forming rolls 75a and 75b, a rewinding roll 77, a vacuum pump 78, and oxygen nozzles 79a and 79b, and the pressure thereof is reduced by the vacuum pump 78. A current collector 17 is rewound by the rewinding roll 77 via the unwinding roll 72 and the film-forming rolls 75a and 75b. On the route thereto, when a deposition substance having evaporated from the deposition sources 74, each of which is positioned at an angle ω relative to the direction perpendicular to the surface of the current collector 17, passes through the film-forming rolls 75a and 75b, it is deposited on both faces of the current collector 17 to form films. The deposition area is defined by the masks 73 so that the deposition substance is deposited at the angle ω. Also, in forming the films by deposition, the oxygen nozzles 79a and 79b for supplying oxygen to the deposition substance are disposed depending on the purpose, to form columns of the respective embodiments of the present invention.

The production device 80 of FIG. 17 has the same structure as the production device 70, but the angle ω is "0".

(1) Preparation of Negative Electrode

Columns comprising a negative electrode active material were produced by using the production device 70 as illustrated in FIG. 16.

First, protrusions were formed on a surface of a 30-μm thick electrolytic copper foil at intervals of 20 μm by plating, and this was used as the current collector.

Columns were formed by using Si as a material of the negative electrode active material and a deposition unit (a unit including a deposition source, crucibles, and an electron beam generator). At this time, inside the vacuum vessel 71 was an argon atmosphere at a pressure of 3.5 Pa. Also, in performing the deposition, the electron beam generated by the electron beam generator was polarized by means of a deflection yoke, and projected onto the deposition source. The deposition source used was scrap of semiconductor wafers (scrap silicon: purity 99.999%). Also, with the shape of the opening of the masks 73 adjusted to make the angle ω 55°, the columns were formed at a deposition speed of approximately 2 nm/s.

Also, using a scanning electron microscope (trade name: S-4700, available from Hitachi, Ltd.), the angle between the columns of the negative electrode and the center line of the current collector was evaluated by the observation of a section thereof, and it was found to be approximately 56°. The thickness of the columns was 30 μm. The shape of the columns was such that the columns completely shielded the depressions of the current collector from the positive electrode. In this way, a negative electrode having the columns on the protrusions of the current collector was obtained.

Thereafter, on the inner side of the negative electrode, a portion of the Cu foil not facing the positive electrode was provided with an exposed area of 30 mm, to which a negative electrode lead made of Cu was welded.

(2) Preparation of Positive Electrode

First, 93 parts by weight of $LiCoO_2$ powder serving as the positive electrode active material was mixed with 4 parts by weight of acetylene black serving as a conductive agent. The resulting powder was mixed with N-methyl-2-pyrrolidone (NMP) solution of polyvinylidene fluoride (PVDF) binder (part number #1320 available from Kureha Corporation) in such an amount that the weight of PVDF was 3 parts by weight. The resulting mixture was mixed with a suitable amount of NMP, to form a positive electrode mixture paste. The positive electrode mixture paste was applied onto both faces of a positive electrode current collector (thickness 15 μm) made of aluminum (Al) foil by using a doctor blade process. This was rolled so that the density of the positive electrode mixture layers was 3.5 g/cc and the thickness 160 μm, fully dried at 85° C., and cut to obtain a positive electrode. On the inner side of the positive electrode, a portion of the Al foil not facing the negative electrode was provided with an exposed area, to which a positive electrode lead made of Al was welded.

(3) Production of Battery

The negative electrode and the positive electrode thus obtained were wound with a 25-μm thick separator made of porous polypropylene interposed therebetween, to form an electrode group. The resulting electrode group and an electrolyte composed of $LiPF_6$ and a mixed solution of ethylene carbonate/diethyl carbonate were placed in a battery case (material: aluminum). The opening of the battery case was sealed with a seal plate and insulating gaskets, to produce a prismatic battery with a height of 52 mm, a width of 34 mm, and a thickness of 5 mm. The design capacity of the battery was set to 1000 mAh.

Example 3

First, silicon (Si) was used as the negative electrode active material capable of absorbing and releasing lithium ions. An oxygen gas with a purity of 99.7% was introduced into the vacuum vessel of the oblique deposition device 70 illustrated in FIG. 16 from the oxygen nozzles 79b placed near the deposition source, to form columns made of $SiO_{0.5}$.

Except for the use of this negative electrode, in the same manner as in Example 1, a non-aqueous electrolyte secondary battery was produced.

Example 4

First, silicon (Si) was used as the negative electrode active material capable of absorbing and releasing lithium ions. An oxygen gas with a purity of 99.7% was introduced into the vacuum vessel of the oblique deposition device 70 illustrated in FIG. 16 from the oxygen nozzles 79a placed near the current collector in the direction perpendicular to the deposition source, thereby varying the value x in the width direction of the columns made of $SiO_x$. In this way, a negative electrode was produced. The negative electrode was subjected to an EPMA line analysis in the sectional direction to analyze the oxygen distribution, and it was found that the oxygen concentration increased continuously in the width direction of the columns from the inclination angle θ side toward the (180−θ) direction.

Except for the use of this negative electrode, in the same manner as in Example 1, a non-aqueous electrolyte secondary battery was produced in Example 4.

Example 5

With the angle ω in the oblique deposition device 70 illustrated in FIG. 16 set to 65°, columns were formed to produce a negative electrode. A cross-section thereof was observed with an SEM, and it was found that the inclination angle was 43° and that there were no extended parts. Except for the use of this negative electrode, in the same manner as in Example 1, a non-aqueous electrolyte secondary battery was produced.

Example 6

First, in the same manner as in Example 1, Si was deposited in film form to form an active material A (lower columnar parts). Thereafter, in the same manner as in Example 2, $SiO_{0.5}$ was provided as an active material B (upper columnar parts) on the active material A to produce a negative electrode.

Except for the use of this negative electrode, in the same manner as in Example 1, a non-aqueous electrolyte secondary battery was produced.

Example 7

A negative electrode was produced in the same manner as in Example 6 except that the angle ω in the oblique deposition device 70 illustrated in FIG. 16 was set to 65°, and a non-aqueous electrolyte secondary battery was produced in the same manner as in Example 1.

Comparative Example 3

Columns were formed in the same manner as in Example 1 except that the angle ω in the oblique deposition device 70 illustrated in FIG. 16 was set to 65°, to produce a negative electrode. A cross-section of the negative electrode was observed with an SEM, and it was found that the inclination angle was 43° and that there were no extended parts. Except for the use of this negative electrode, in the same manner as in Example 1, a non-aqueous electrolyte secondary battery was produced.

Comparative Example 4

Columns were formed in the same manner as in Example 2 except that the angle ω in the oblique deposition device 70 illustrated in FIG. 16 was set to 65°, to produce a negative electrode. A cross-section of the negative electrode was observed with an SEM, and it was found that the inclination angle was 43° and that there were no extended parts. Except for the use of this negative electrode, in the same manner as in Example 1, a non-aqueous electrolyte secondary battery was produced.

Comparative Example 5

A negative electrode was produced in the same manner as in Example 1, using the deposition device 80 illustrated in FIG. 17. A cross-section of the negative electrode was observed with an SEM, and it was found that the inclination angle was 90°. Except for the use of this negative electrode, in the same manner as in Example 1, a non-aqueous electrolyte secondary battery was produced.

The non-aqueous electrolyte secondary batteries produced in Examples 2 to 7 and Comparative Examples 2 to 5 were evaluated in the following manner.

(Measurement of Battery Capacity)

The respective non-aqueous electrolyte secondary batteries were charged/discharged at an ambient temperature of 25° C. under the following conditions.

First, at a constant current of 1.0 C hour rate (1000 mA) relative to the design capacity (1000 mAh), the batteries were charged until the battery voltage reached 4.2 V, and charged at a constant voltage of 4.2 V until the current dropped to a value of 0.05 C hour rate (50 mA). They were then allowed to stand for 30 minutes.

Thereafter, the batteries were discharged at a constant current of 1.0 C hour rate (1000 mA) until the battery voltage dropped to 3.0 V.

With the above being 1 cycle, the discharge capacity at the $3^{rd}$ cycle was defined as the battery capacity.

(Capacity Retention Rate)

The respective non-aqueous electrolyte secondary batteries were repeatedly charged/discharged at an ambient temperature of 25° C., under the following conditions.

First, at a constant current of 1.0 C hour rate (1000 mA) relative to the design capacity (1000 mAh), the batteries were charged until the battery voltage reached 4.2 V, and charged at a constant voltage of 4.2 V until the charge current dropped to a current value of 0.05 C hour rate (50 mA). After the charge, they were allowed to stand for 30 minutes.

Thereafter, the batteries were discharged at a constant current of 1.0 C hour rate (1000 mA) until the battery voltage dropped to 3.0 V. After the discharge, they were allowed to stand for 30 minutes.

This charge/discharge cycle was 1 cycle, and was repeated 100 times. The percentage of the discharge capacity at the 100th cycle relative to the discharge capacity at the 1st cycle was used as the capacity retention rate (%). That is, as the capacity retention rate is closer to 100, the charge/discharge cycle characteristic is better.

(High-Rate Characteristic)

The respective non-aqueous electrolyte secondary batteries were charged/discharged at an ambient temperature of 25° C. under the following conditions.

First, at a constant current of 0.2 C hour rate (200 mA) relative to the design capacity (1000 mAh), the batteries were charged until the battery voltage reached 4.2 V, and charged at a constant voltage of 4.2 V until the current dropped to a value of 0.05 C hour rate (50 mA). They were then allowed to stand for 30 minutes.

Thereafter, the batteries were discharged at a constant current of 0.2 C hour rate (200 mA) until the battery voltage dropped to 3.0 V. This was defined as the 0.2 C discharge capacity.

Next, the batteries were charged in the same manner as described above, and then discharged at a constant current of 2.0 C hour rate (2000 mA) until the battery voltage dropped to 3.0 V. This was defined as the 2.0 C discharge capacity.

The percentage (%) of the 2 C discharge capacity relative to the 0.2 C discharge capacity was defined as the high-rate characteristic (2C/0.2C×100).

(Low-Temperature Characteristic)

The respective non-aqueous electrolyte secondary batteries were charged/discharged at an ambient temperature of 25° C. under the following conditions.

First, at a constant current of 1.0 C hour rate (1000 mA) relative to the design capacity (1000 mAh), the batteries were charged until the battery voltage reached 4.2 V, and charged at a constant voltage of 4.2 V until the current dropped to a value of 0.05 C hour rate (50 mA). They were then allowed to stand for 30 minutes.

Thereafter, the batteries were discharged at a constant current of 1.0 C hour rate (1000 mA) until the battery voltage dropped to 3.0 V. This was defined as the 25° C. discharge capacity.

Next, the batteries were charged in the same manner as described above, and then discharged at a constant current of 1.0 C hour rate (1000 mA) at an ambient temperature of −20°

C. until the battery voltage dropped to 3.0 V. This was defined as the −20° C. discharge capacity.

The percentage (%) of the −20° C. discharge capacity relative to the 25° C. discharge capacity was defined as the low-temperature characteristic.

With respect to the non-aqueous electrolyte secondary batteries produced in Examples 2 to 7 and Comparative Examples 3 to 5, the features of their negative electrodes and the evaluation results are shown in Table 2.

TABLE 2

| | | Features of negative electrode | | | Evaluation results | | | |
|---|---|---|---|---|---|---|---|---|
| | | Active material or active material A | Active material B | Thin film part | Discharge capacity (mAh) | Capacity retention rate (%) | High-rate characteristic | Low temperature characteristic |
| Examples | 2 | Si | — | Yes | 1000 | 82 | 85 | 61 |
| | 3 | $SiO_{0.5}$ | — | Yes | 1001 | 79 | 86 | 58 |
| | 4 | $SiO_{0.05-1.5}$ | — | Yes | 1000 | 87 | 92 | 68 |
| | 5 | $SiO_{0.05-1.5}$ | — | No | 1001 | 83 | 89 | 64 |
| | 6 | Si | $SiO_{0.5}$ | Yes | 1000 | 86 | 88 | 65 |
| | 7 | Si | $SiO_{0.5}$ | No | 1000 | 82 | 84 | 61 |
| Comp. Examples | 3 | Si | | No | 1000 | 79 | 82 | 35 |
| | 4 | $SiO_{0.5}$ | | No | 999 | 75 | 79 | 31 |
| | 5 | Si | | No | 1000 | 35 | 91 | 64 |

As shown in Table 2, a comparison between Examples 2 and 3 and Comparative Examples 3 and 4 showed that there was almost no difference due to the materials of the active materials in capacity retention rate and high-rate characteristic in the 25° C. environment. However, in the low-temperature characteristic, Comparative Examples 3 and 4 having no thin film part of active material exhibited a significant decline in discharge capacity compared with Examples 2 and 3. This is probably because the inclination angle of the columns of Examples 2 and 3 changes due to charge/discharge, and the inclination angle during discharging is large, so that the move distance of the lithium ions is short, which facilitates the convection of electrolyte. On the other hand, the inclination angle of the columns of Comparative Examples 3 and 4 does not change and is small. Probably for this reason, particularly at low temperatures, the lithium ions contributing to discharge are difficult to move at an early stage of discharge, and thus the battery voltage drops to or below the voltage that the discharge stops, thereby resulting in the low temperature characteristic.

Also, a comparison between Example 2 and Comparative Example 5 shows that Comparative Example 5 having a large inclination angle of about 90° was excellent in high-rate characteristic and low-temperature characteristic in the initial state, but that the capacity retention rate lowered extremely with increasing charge/discharge cycles. This is because the inclination angle in Comparative Example 5 does not change, and thus, with increasing cycles, lithium metal deposits on the current collector during charging, thereby resulting in a decrease in capacity. On the other hand, in Example 2, during charging, the current collector surface is covered with the columns that extend slantwise, and therefore, the deposition of lithium metal is unlikely to occur, thereby resulting in a high capacity retention rate.

Also, in Examples 4 and 5, the inclination angle of the columns is changed by changing the content of the element forming the columns in the width direction from the acute angle side toward the obtuse angle side to cause a change in the amount of the expansion and contraction of the columns due to the absorption and release of lithium ions. It is clear that such structure can also provide a non-aqueous electrolyte secondary battery that is excellent in capacity retention rate, high-rate characteristic (large-current discharge characteristic), and low-temperature characteristic in the same manner as in Examples 2 and 3. In particular, it has been found that providing the lower parts of the columns with the thin film parts as in Example 4 can further improve the capacity retention rate, high-rate characteristic, and low-temperature characteristic, compared with Example 5 having no thin film parts. This effect can be obtained probably because the thin film parts can further enlarge the inclination angle of the columns.

Likewise, in Examples 6 and 7, the inclination angle of the columns is changed by providing the lower columnar part and the upper columnar part that are different in a change in the amount of expansion and contraction due to the absorption and release of lithium ions. It is clear that this structure can also provide a non-aqueous electrolyte secondary battery that is excellent in capacity retention rate, high-rate characteristic, and low-temperature characteristic in the same manner as in Examples 2 and 3. In particular, it has been found that providing the thin film parts under the lower columnar parts as in Example 6 can further improve the capacity retention rate, high-rate characteristic, and low-temperature characteristic, compared with Example 7 having no thin film parts. This effect can be obtained probably because the thin film parts can further enlarge the inclination angle of the columns.

As described in the foregoing Examples, in the non-aqueous electrolyte secondary battery including the negative electrode of the present invention, the negative electrode includes inclined columns that are formed on a current collector, and the inclination angle of the columns due to the expansion and contraction upon battery charge/discharge is reversibly changed. Thus, impediments to charge/discharge can be effectively eliminated, and therefore, the electric characteristics important for secondary batteries can be improved.

Examples 4 and 5 have been described with reference to examples in which SiOx is used as an example of the active material and the value x is varied from 0.05 to 1.5, but this is not construed as limiting. As long as $0 \leq x < 2$, essentially the same effect can be obtained. In particular, if the value x is 0.2 to 0.7, it is particularly preferable and a large effect can be obtained.

Also, Examples 6 and 7 have been described with reference to examples in which SiOx is used as the active material B and the value x is 0.5, but this is not construed as limiting. If $0 < x < 2$, essentially the same effect can be obtained.

Also, the foregoing Examples have been described with reference to examples in which Si or SiOx is used as the active material. However, the active material is not particularly limited as long as it is an element capable of reversibly absorbing and releasing lithium ions, and at least one element selected from, for example, Al, In, Zn, Cd, Bi, Sb, Ge, Pb, and Sn can be preferably used. Further, the negative electrode active material may contain other materials than the above-mentioned elements. For example, it may contain transition metal or 2A group elements.

In the present invention, the shape of and the interval between the protrusions formed on the current collector are not limited to those described in the foregoing Embodiments, and any shape may be employed if inclined columns can be formed.

Also, the inclination angle formed between the center line of the columns and the center line of the current collector, and the shape and dimensions of the columns are not limited to the foregoing Embodiments, and they can be changed as appropriate depending on the production method of the negative electrode and the characteristics necessary for the non-aqueous electrolyte secondary battery.

INDUSTRIAL APPLICABILITY

The negative electrode for a non-aqueous electrolyte secondary battery of the present invention can provide a non-aqueous electrolyte secondary battery that is excellent in high-rate characteristic, charge/discharge cycle characteristic, and low-temperature characteristic while enabling high energy density. It is therefore useful as the secondary battery for portable electronic devices such as cellular phones, notebook PCs, and PDAs, the demand for which is expected to rise from now on, and large-sized electronic devices.

The invention claimed is:

1. A negative electrode for a non-aqueous electrolyte secondary battery, comprising:
   a current collector having depressions and protrusions on the surface of one face or both faces in a thickness direction thereof; and
   a negative electrode active material layer that includes columns containing a negative electrode active material that absorbs and releases lithium ions, wherein the columns are grown outwardly from the surface of the current collector having the depressions and the protrusions, the columns are inclined at an angle relative to the direction perpendicular to the surface of the current collector,
   said columns are configured such that the inclination angle of the columns relative to the direction perpendicular to the surface of the current collector changes reversibly depending on absorption and release of lithium ions by the negative electrode active material,
   each of the columns includes an upper columnar part and a lower columnar part, the lower columnar part expands and contracts due to absorption and release of lithium more than the upper columnar part,
   the upper columnar part is a part of the column located on an obtuse angle side in a cross-section of the column in the thickness direction of the current collector, an obtuse angle being formed between a center line of the column in the grow direction thereof and a center line of the current collector in a longitudinal direction thereof, and
   the lower columnar part is a part of the column located on an acute angle side in the cross-section of the column in the thickness direction of the current collector, an acute angle being formed between the center line of the column in the grow direction thereof and the center line of the current collector in the longitudinal direction thereof.

2. The negative electrode for a non-aqueous electrolyte secondary battery in accordance with claim 1,
   wherein each of the columns includes a thin film part and a columnar parts adjacent to the thin film part,
   the thin film part is a thin film formed on a part of the surface of each of the depressions or formed so as to extend from a part of the surface of each of the depressions to at least a part of the surface of the adjacent protrusion, and
   the columnar part is grown outwardly from at least a part of the surface of each of the protrusions, or at least a part of the surface of each of the protrusions and a part of the surface of the adjacent thin film part, being inclined at an angle relative to the direction perpendicular to the surface of the current collector.

3. The negative electrode for a non-aqueous electrolyte secondary battery in accordance with claim 2, wherein the content of an element in the negative electrode active material is changed continuously or non-continuously toward the grow direction of the columns.

4. The negative electrode for a non-aqueous electrolyte secondary battery in accordance with claim 2, wherein the thin film part has a thickness of 0.5 μm to 5 μm.

5. The negative electrode for a non-aqueous electrolyte secondary battery in accordance with claim 1, wherein a content of an element in the negative electrode active material is changed continuously or non-continuously from the acute angle side toward the obtuse angle side in the cross-section of the column in the thickness direction of the current collector.

6. The negative electrode for a non-aqueous electrolyte secondary battery in accordance with claim 1, wherein an area of the contact portions of the columns and the current collector orthogonally projected from the direction perpendicular to the surface of the current collector is 60% or more and less than 100% of the area of the surface of the current collector having the depressions and protrusions orthogonally projected from the direction perpendicular to the surface of the current collector.

7. The negative electrode for a non-aqueous electrolyte secondary battery in accordance with claim 1, wherein the negative electrode active material is a negative electrode active material having a higher theoretical capacity density of reversible lithium absorption and release than a theoretical capacity density of reversible lithium absorption and release of graphite.

8. The negative electrode for a non-aqueous electrolyte secondary battery in accordance with claim 7, wherein the negative electrode active material is at least one selected from the group consisting of silicon and a silicon-containing compound.

9. The negative electrode for a non-aqueous electrolyte secondary battery in accordance with claim 8, wherein the silicon-containing compound is a silicon oxide represented by the formula SiOx where $0.05<x<1.95$.

10. The negative electrode for a non-aqueous electrolyte secondary battery in accordance with claim 1, wherein the negative electrode active material layer has a thickness of 5 μm to 50 μm.

11. A method for producing a negative electrode for a non-aqueous electrolyte secondary battery, comprising:
    (i) a current-collector-working step of forming depressions and protrusions on the surface of one face or both faces of a current collector in the thickness direction thereof;

(ii) a thin-film-forming step of projecting the vapor of a negative electrode active material onto the surface of the current collector having the depressions and protrusions for deposition, in such a manner that the incident angle $\phi$ of the vapor of the negative electrode active material relative to the direction perpendicular to the surface of the current collector satisfies the formula $2H/L < \tan(90-\phi)$ where H represents the effective height of the protrusions and L represents the width of the depressions, thereby forming a thin film containing the negative electrode active material on the surface of each of the protrusions and a part of the surface of each of the depressions; and (iii) the column-forming step of projecting the vapor of the negative electrode active material onto the surface of the current collector having the depressions and protrusions for deposition, in such a manner that the incident angle $\phi$ of the vapor of the negative electrode active material relative to the direction perpendicular to the surface of the current collector satisfies the formula $2H/L \geq \tan(90-\phi)$ where H and L represent the same as the above, thereby forming columns containing the negative electrode active material on the surfaces of the protrusions, or the surfaces of the protrusions and the surface of the thin film, so that each of the columns is grown outwardly from the surface of the protrusion, or the surface of the protrusion and a part of the surface of the thin film, being inclined at an angle relative to the direction perpendicular to the surface of the current collector.

12. A non-aqueous electrolyte secondary battery comprising the negative electrode for a non-aqueous electrolyte secondary battery of claim 1, a positive electrode reversibly absorbing and releasing lithium ions, a separator, and a non-aqueous electrolyte.

* * * * *